US009530317B2

(12) United States Patent
Teramoto et al.

(10) Patent No.: US 9,530,317 B2
(45) Date of Patent: *Dec. 27, 2016

(54) MOVEMENT-MEASUREMENT-PROCESSING SYSTEM, MOVEMENT-MEASUREMENT-PROCESSING METHOD, AND MOVEMENT-MEASUREMENT-PROCESSING PROGRAM

(71) Applicant: NEC Corporation, Minato-ku, Tokyo (JP)

(72) Inventors: Sachio Teramoto, Tokyo (JP); Koji Kida, Tokyo (JP); Hiroki Tagato, Tokyo (JP); Tomohito Ando, Tokyo (JP)

(73) Assignee: NEC CORPORATION, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 14/394,523

(22) PCT Filed: May 20, 2013

(86) PCT No.: PCT/JP2013/003192
§ 371 (c)(1),
(2) Date: Oct. 15, 2014

(87) PCT Pub. No.: WO2013/186989
PCT Pub. Date: Dec. 19, 2013

(65) Prior Publication Data
US 2015/0073690 A1    Mar. 12, 2015

(30) Foreign Application Priority Data
Jun. 13, 2012    (JP) ................................. 2012-133865

(51) Int. Cl.
*G08G 5/00* (2006.01)
*B64F 1/00* (2006.01)
*G08G 5/04* (2006.01)

(52) U.S. Cl.
CPC ............. *G08G 5/0017* (2013.01); *B64F 1/002* (2013.01); *G08G 5/0043* (2013.01); *G08G 5/045* (2013.01)

(58) Field of Classification Search
CPC ..... B64F 1/002; G08G 5/0043; G08G 5/0017; G08G 5/045
See application file for complete search history.

(56) References Cited

U.S. PATENT DOCUMENTS 6,195,609 B1 * 2/2001 Pilley ..................... G01C 23/00
342/36
6,445,308 B1 * 9/2002 Koike ................... G01S 5/0072
180/167

FOREIGN PATENT DOCUMENTS

JP    6-168026 A    6/1994
JP    2000-276696 A    10/2000
(Continued)

OTHER PUBLICATIONS

Yutaka Fukuda et al., "Development of Assisting Tool for Time Management of Air Traffic Control", IEICE Technical Report, The Institute of Electronics, Information and Communication Engineers, SANE2008-45, Jul. 2008, pp. 23-28, with English Abstract. Cited in the Applicant's Specification on p. 2, [0005].

(Continued)

Primary Examiner — Yuen Wong

(57) ABSTRACT

A peripheral aircraft selection means maps a region in a 3D space defined by a start point of period information of the aircraft of interest, a point having the coordinate values of passage position coordinates at an end point of the period information and a lower limit arrival time, and a point (Continued)

having the coordinate values of passage position coordinates at the end point of the period information and an upper limit arrival time onto a 2D plane by use of a first projection matrix. The peripheral aircraft selection means then selects a peripheral aircraft which can abnormally near to the aircraft of interest by determining how the resultant region crosses with a circle whose center is a passage position of the peripheral aircraft and whose radius is a determination standard threshold as to whether abnormal nearing will occur.

3 Claims, 18 Drawing Sheets

(56) References Cited

FOREIGN PATENT DOCUMENTS

| WO | 2007/102367 A1 | 9/2007 |
|----|----------------|--------|
| WO | 2011/114635 A1 | 9/2011 |

OTHER PUBLICATIONS

International Search Report for PCT Application No. PCT/JP2013/003192, mailed on Aug. 13, 2013.

* cited by examiner

MOVEMENT-MEASUREMENT-PROCESSING SYSTEM, MOVEMENT-MEASUREMENT-PROCESSING METHOD, AND MOVEMENT-MEASUREMENT-PROCESSING PROGRAM

This application is a National Stage Entry of PCT/JP2013/003192 filed on May 20, 2013, which claims priority from Japanese Patent Application 2012-133865 filed on Jun. 13, 2012, the contents of all of which are incorporated herein by reference in their entirety.

TECHNICAL FIELD

The present invention relates to a movement-measurement-processing system for specifying a peripheral aircraft which can abnormally near to an aircraft of interest based on movement plans of moving bodies, a movement-measurement-processing method therefor, and a movement-measurement-processing program therefor.

BACKGROUND ART

There is proposed a technique for determining movement plans such that moving bodies do not abnormally near to each other for the moving bodies (such as aircrafts, trains and buses) passing through "defined positions (passage designated positions)" at "defined scheduled times (passage scheduled times)" (see NPL 1, for example).

NPL 1 describes therein a simulation-based abnormal nearing detection technique. NPL 1 describes that a check is made in order of time as to whether a passage condition such as distance between a precedent aircraft and a subsequent aircraft is met. It further describes that when the condition is not met, the passage times of the aircrafts are delayed.

An aircraft movement plan describes "passage designated positions (latitude and longitude)" and "passage scheduled times" for a plurality of passage designated positions. Then, the aircraft passes through the passage designated positions at passage scheduled times according to the movement plan acquired at the departure airport, and flies to the destination airport. However, the aircraft may not pass through the passage designated positions at the passage scheduled times due to influences such as weather variation in actual flying. In such a case, the air control scheduling system adjusts the movement plan acquired by the aircraft at the departure airport, and determines a new movement plan not to cause abnormal nearing. Such a movement plan subjected to adjustment may be denoted as adjusted movement plan. Abnormal nearing between moving bodies may be denoted as conflict.

CITATION LIST

Non Patent Literature

NPL 1: FUKUDA Yutaka, OKA Megumi and YAMAMOTO Tetsushi, "Development of Assisting Tool for Time Management of Air Traffic Control", IEICE Technical Report. SANE, The Institute of Electronics, Information and Communication Engineers, Jul. 18, 2008, Vol. 108, No. 169, pp. 23-28

SUMMARY OF INVENTION

Technical Problem

There may by assumed that the technique in NPL 1 is applied when abnormal nearing between one moving body of interest (which will be denoted as aircraft of interest) out of a plurality of moving bodies and other moving bodies (which will be denoted as peripheral aircrafts) is detected thereby to determine an adjusted movement plan. In this case, an individual peripheral aircraft needs to be determined for presence of abnormal nearing to the aircraft of interest in order of time. Thus, a processing time to detect abnormal nearing is longer. In particular, the processing time is longer with more peripheral aircrafts.

If a peripheral aircraft which can be an obstacle for the aircraft of interest (or peripheral aircraft which can abnormally near to the aircraft of interest) can be selected when an adjusted movement plan is determined, the movement plan may be adjusted by use of the movement plans of the peripheral aircraft and the aircraft of interest. Thus, it is preferable to quickly select a peripheral aircraft which can abnormally near to the aircraft of interest.

It is therefore an object of the preset invention to provide a movement-measurement-processing system capable of quickly specifying a peripheral aircraft which can abnormally near to an aircraft of interest, a movement-measurement-processing method therefor and a movement-measurement-processing program therefor.

Solution to Problem

A movement-measurement-processing system according to the present invention includes a period information creation means for creating a set of period information each having a 3D coordinate with the coordinate values of 2D coordinates of a passage position of a moving body and its passage time as information on a start point and an end point from a movement plan of an aircraft of interest which is a moving body for which the movement plan is to be adjusted and a movement plan of each peripheral aircraft which is a moving body other than the aircraft of interest, an arrival time calculation means for calculating a lower limit arrival time which is an end point arrival time when the aircraft of interest moves at an upper limit speed and an upper limit arrival time which is an end point arrival time when it moves at a lower limit speed for each item of period information of the aircraft of interest, a projection matrix calculation means for calculating a first projection matrix indicating mapping from a 3D space onto a 2D plane based on a period information pair having one item of period information of the aircraft of interest and one item of period information of a peripheral aircraft, and a peripheral aircraft selection means for selecting a peripheral aircraft which can abnormally near to the aircraft of interest by determining how a region obtained by mapping a region in a 3D space defined by a start point of period information of the aircraft of interest, a point having the coordinate values of passage position coordinates at an end point of the period information and a lower limit arrival time, and a point having the coordinate values of the passage position coordinates at the end point of the period information and an upper limit arrival time into a 2D plane by use of the first projection matrix crosses with a circle whose center is a passage position of the peripheral aircraft and whose radius is a determination standard threshold as to whether abnormal nearing will occur.

A movement-measurement-processing method according to the present invention includes the steps of creating a set of period information each having a 3D coordinate with the coordinate values of 2D coordinates of a passage position of a moving body and its passage time as information on a start point and an end point from a movement plan of an aircraft of interest which is a moving body for which the movement plan is to be adjusted and a movement plan of each peripheral aircraft which is a moving body other than the aircraft of interest, calculating a lower limit arrival time which is an end point arrival time when the aircraft of interest moves at an upper limit speed and an upper limit arrival time which is an end point arrival time when it moves at a lower limit speed for each item of period information of the aircraft of interest, calculating a first projection matrix indicating mapping from a 3D space onto a 2D plane based on a period information pair having one item of period information of the aircraft of interest and one item of period information of a peripheral aircraft, and selecting a peripheral aircraft which can abnormally near to the aircraft of interest by determining how a region obtained by mapping a region in a 3D space defined by a start point of period information of the aircraft of interest, a point having the coordinate values of passage position coordinates at an end point of the period information and a lower limit arrival time, and a point having the coordinate values of the passage position coordinates at the end point of the period information and an upper limit arrival time into a 2D plane by use of the first projection matrix crosses with a circle whose center is a passage position of the peripheral aircraft and whose radius is a determination standard threshold as to whether abnormal nearing will occur.

A movement-measurement-processing program according to the present invention includes causing a computer to perform period information creation processing of creating a set of period information each having a 3D coordinate with the coordinate values of 2D coordinates of a passage position of a moving body and its passage time as information on a start point and an end point from a movement plan of an aircraft of interest which is a moving body for which the movement plan is to be adjusted and a movement plan of each peripheral aircraft which is a moving body other than the aircraft of interest, arrival time calculation processing of calculating a lower limit arrival time which is an end point arrival time when the aircraft of interest moves at an upper limit speed and an upper limit arrival time which is an end point arrival time when it moves at a lower limit speed for each item of period information of the aircraft of interest, projection matrix calculation processing of calculating a first projection matrix indicating mapping from a 3D space onto a 2D plane based on a period information pair having one item of period information of the aircraft of interest and one item of period information of a peripheral aircraft, and peripheral aircraft selection processing of selecting a peripheral aircraft which can abnormally near to the aircraft of interest by determining how a region obtained by mapping a region in a 3D space defined by a start point of period information of the aircraft of interest, a point having the coordinate values of passage position coordinates at an end point of the period information and a lower limit arrival time, and a point having the coordinate values of the passage position coordinates at the end point of the period information and an upper limit arrival time into a 2D plane by use of the first projection matrix crosses with a circle whose center is a passage position of the peripheral aircraft and whose radius is a determination standard threshold as to whether abnormal nearing will occur.

Advantageous Effects of the Invention

According to the present invention, it is possible to quickly specify a peripheral aircraft which can abnormally near to an aircraft of interest.

DESCRIPTION OF EMBODIMENTS

Exemplary embodiments according to the present invention will be described below with reference to the drawings. Each exemplary embodiment described later will be described by way of a case in which the moving bodies are aircrafts, but the moving bodies are not limited to aircrafts.

Each exemplary embodiment described later assumes that an aircraft for which a movement plan is to be adjusted is an aircraft of interest and aircrafts other than the aircraft of interest are peripheral aircrafts.

The movement plan will be described herein. The movement plan is described as a set of lists of coordinates of passage points on a 2D plane of a moving body (aircraft in the present example) and their passage times. The coordinate of each passage point is indicated by an x coordinate and a y coordinate in the 2D plane. Each exemplary embodiment described later will be described by way of a case in which a longitude is at an x coordinate and a latitude is at a y coordinate. A period defined by one pair of adjacent passage points in order of passage time in a movement plan of a moving body will be denoted as link. The movement plan indicates a set of links, and defines a start point coordinate and its passage time as well as an end point coordinate and its passage time of each link. Such a movement plan is defined per moving body. The movement plan of the aircraft of interest will be denoted as aircraft-of-interest movement plan. The movement plan of a peripheral aircraft will be denoted as peripheral aircraft movement plan.

A distance threshold as a determination standard as to whether abnormal nearing between moving bodies has occurred is called safe distance. That is, when a distance between moving bodies is less than the safe distance, abnormal nearing is occurring, and when a distance between moving bodies is equal to or more than the safe distance, abnormal nearing is not occurring. The safe distance is called oceanic airspace in the air control.

First Exemplary Embodiment

Figure 1:
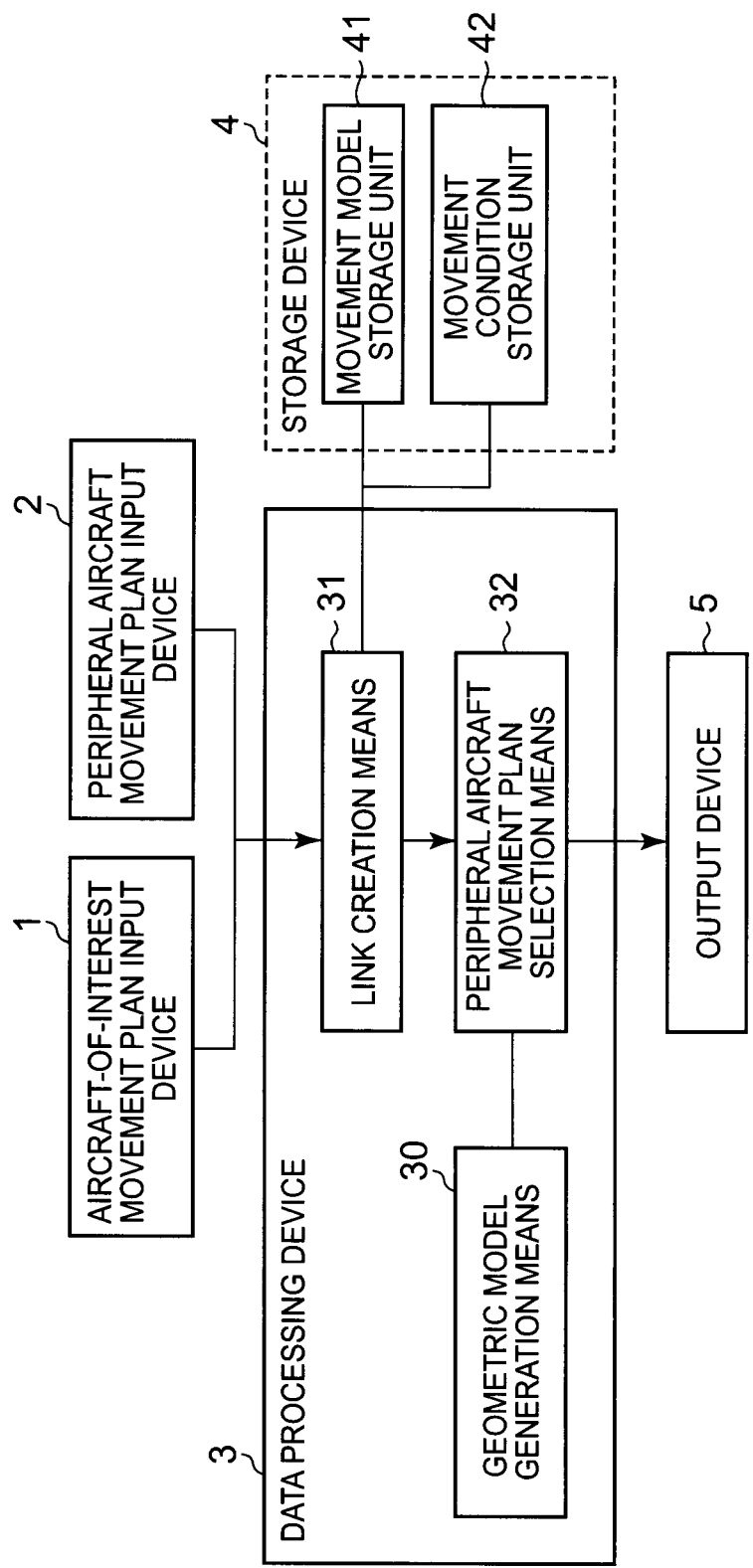
FIG. 1 It depicts a block diagram illustrating an exemplary structure of a movement-measurement-processing system according to a first exemplary embodiment of the present invention.

FIG. 1 is a block diagram illustrating an exemplary structure of a movement-measurement-processing system according to a first exemplary embodiment of the present invention. The movement-measurement-processing system according to the present exemplary embodiment includes an aircraft-of-interest movement plan input device 1, a peripheral aircraft movement plan input device 2, a data processing device 3, a storage device 4 and an output device 5.

The aircraft-of-interest movement plan input device 1 is an input interface for an aircraft-of-interest movement plan. The peripheral aircraft movement plan input device 2 is an input interface for peripheral aircraft movement plans. The aircraft-of-interest movement plan input device 1 and the peripheral aircraft movement plan input device 2 may be realized by the same input device.

The storage device 4 is realized by an optical disk device, a magnetic disk device and the like, for example. The storage device 4 includes a movement model storage unit 41 and a movement condition storage unit 42.

The movement model storage unit 41 stores data indicating a movement form when a moving body moves through links (which will be denoted as movement model below). The manager of the movement-measurement-processing system previously stores the movement models in the movement model storage unit 41. Exemplary movement models include uniform motion, uniformly-accelerated motion and the like. In each exemplary embodiment, the movement model storage unit 41 is assumed to store a movement model indicating uniform motion. That is, a moving body is assumed to conduct uniform linear motion from the start point to the end point of a link for each link.

The movement condition storage unit 42 previously stores movement conditions restricting a speed when a moving body moves through links. Specifically, the movement condition storage unit 42 stores an upper limit speed and a lower limit speed which are permitted as the speeds of the moving body as the movement conditions. The movement condition storage unit 42 stores safe distance. The manager of the movement-measurement-processing system previously stores the movement conditions and the safe distance in the movement condition storage unit 42.

Figure 2:
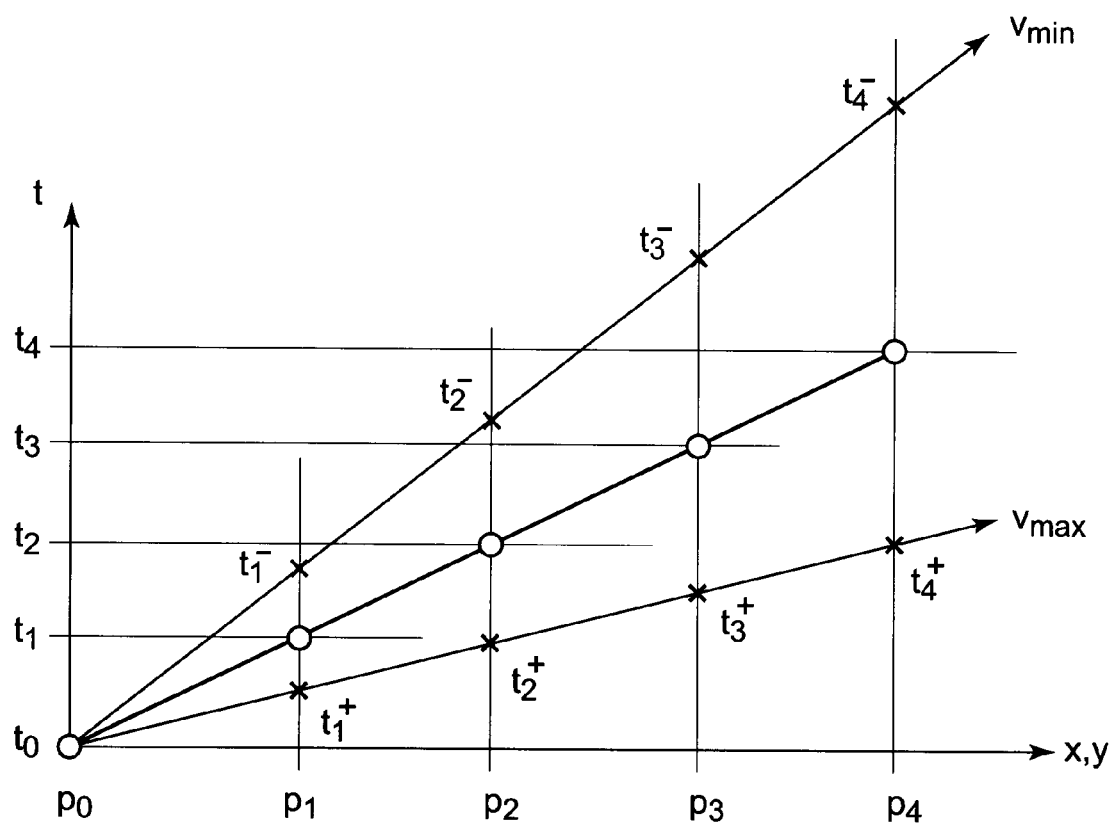
FIG. 2 It depicts a schematic diagram illustrating passage times at passage points.

FIG. 2 is a schematic diagram illustrating passage times at passage points, respectively. The horizontal axis illustrated in FIG. 2 indicates a passage position of a moving body and the vertical axis indicates a time. Assuming i=0, 1, 2, 3, 4, the passage time at each position $p_i$ is $t_i$. $t_i$ is a passage time defined in the movement plan. In FIG. 2, a passage time at each position $p_i$ when a moving body moves at an upper limit speed ($V_{max}$) is indicated as $t_i^+$. Further, a passage time at each position $p_i$ when a moving body moves at a lower limit speed ($v_{min}$) is indicated as $t_i^-$. $t_i^+$ is earlier than $t_i$ and $t_i^-$ is later than $t_i$.

The data processing device 3 is a computer (such as personal computer or work station) operating according to a program, for example. The data processing device 3 includes a link creation means 31, a peripheral aircraft movement plan selection means 32 and a geometric model generation means 30.

The link creation means 31 creates a set of links per movement plan for the aircraft-of-interest movement plan input via the aircraft-of-interest movement plan input device 1 and individual peripheral movement plans input via the peripheral aircraft movement plan input device 2. The link creation means 31 arranges the 3D coordinates each having the coordinate values of the position coordinates of a passage point in the 2D plane and its passage time for one movement plan in ascending order of passage time. The link creation means 23 then creates a set of links with one pair of adjacent 3D coordinates as one link. The link creation means 31 performs the processing per movement plan.

The information on the start point and the end point of each link includes information on the position coordinates (x coordinate, y coordinate) of a passage point in the 2D plane and a time. Thus, the information on the start point and the end point of each link may indicate a point in the 3D space with the x axis and the y axis in the 2D plane added with a temporal axis as the third axis (which will be denoted as t axis below).

The link creation means 31 has a function of calculating an end point time of a link during movement at the upper limit speed or the lower limit speed defined as the movement condition in each link.

When the aircraft of interest flies at a speed meeting the movement condition, the peripheral aircraft movement plan selection means 32 selects a peripheral aircraft movement plan which can cause abnormal nearing. The peripheral aircraft movement plan selection means 32 extracts a pair including one link of the aircraft of interest and one link of a peripheral aircraft which have a common part in the times from the start point time to the end point time defined by the movement plans. The peripheral aircraft movement plan selection means 32 performs the processing on the pair in ascending order of time, and determines whether the aircraft of interest can abnormally near to the peripheral aircraft.

The peripheral aircraft movement plan selection means 32 inputs a pair including one link of the aircraft of interest and one link of a peripheral aircraft into the geometric model generation means 30. A pair including one link of the aircraft of interest and one link of a peripheral aircraft may be denoted as link pair below. The geometric model generation means 30 calculates a projection matrix indicating mapping from a 3D space defined by an x axis, a y axis and a t axis (which will be simply denoted as 3D space) onto a 2D plane based on a link pair. The 2D plane is at the later time out of the start point times of the two links in the link pair. There will be described below a case in which the start point times of the two links in a link pair are common for simplified description.

Figure 3:
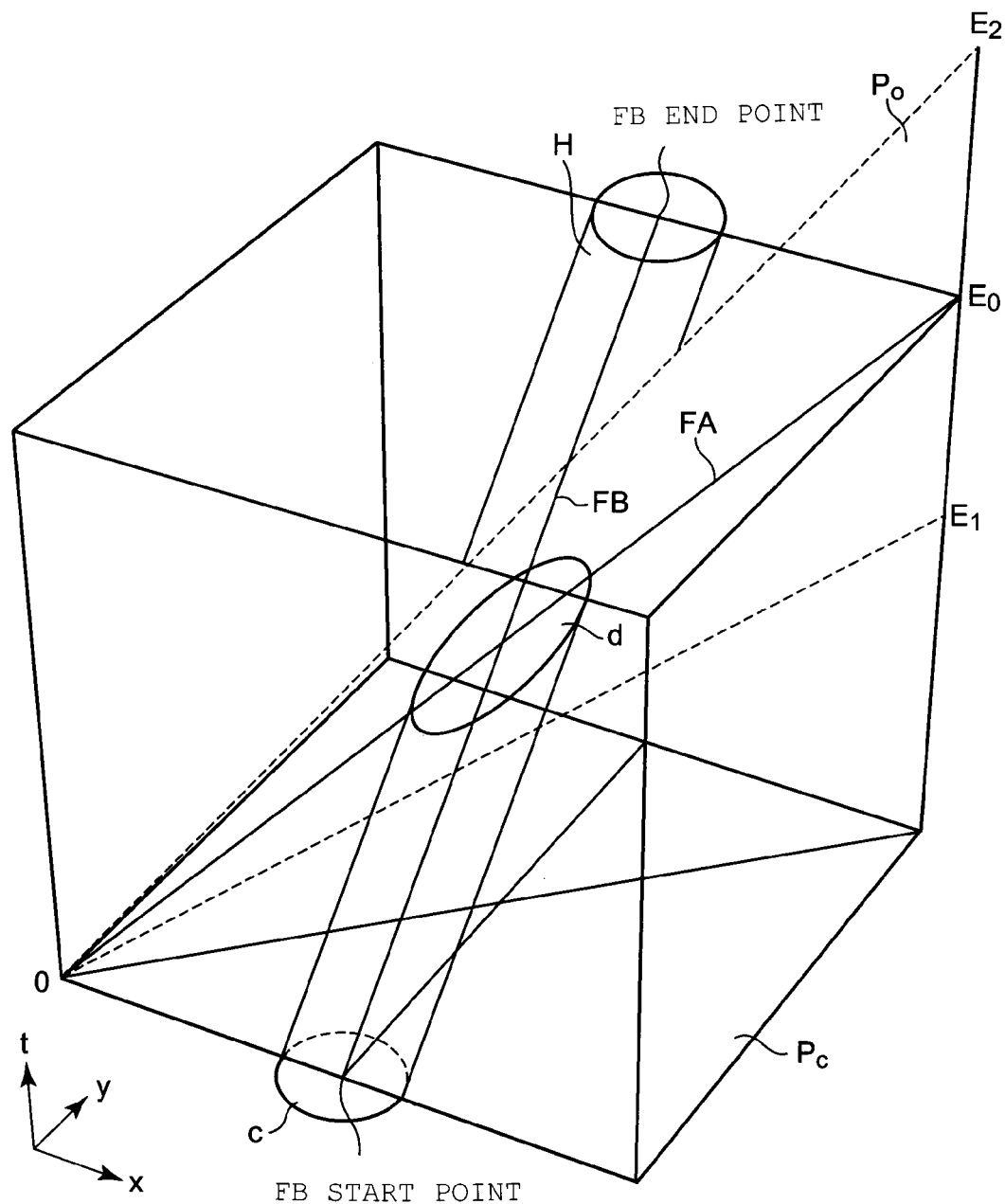
FIG. 3 It depicts an explanatory diagram illustrating a 3D space and a 2D plane at the start point time of a link.

FIG. 3 is an explanatory diagram illustrating a 3D space and a 2D plane at the start point time of a link. The link FA illustrated in FIG. 3 is a link of the aircraft of interest. The link FB is a link of the peripheral aircraft. In the example illustrated in FIG. 3, the start point times of the two links FA and FB are common at t=0. Thus, the later time out of the start point times of the two links is t=0. When being with the link pair (FA and FB) illustrated in FIG. 3, the geometric model generation means 30 calculates a projection matrix indicating mapping from the 3D space onto the 2D plane at t=0. The 2D plane to be mapped from the 3D space will be denoted as calculation plane below. The mapping from the 3D space onto the 2D plane is along the link FB of the peripheral aircraft.

In the example illustrated in FIG. 3, when the speed of the aircraft of interest is accelerated, the end point time of the link FA is put ahead, and when the speed of the aircraft of interest is decelerated, the end point time of the link FA is delayed. The point $E_0$ illustrated in FIG. 3 indicates the end point of the link FA defined from the aircraft-of-interest movement plan. The point $E_1$ indicates the end point of the link when the aircraft of interest moves at the upper limit speed and the end point time is put ahead. The point $E_2$ indicates the end point of the link when the aircraft of interest moves at the lower limit speed and the end point time is delayed. In this way, the speed of the aircraft of interest is changed thereby to define the plane including the start point 0, $E_1$ and $E_2$ of the link FA. The region (plane domain) surrounded by the start point 0, $E_1$ and $E_2$ of the link FA is denoted as $P_0$.

There is assumed a state in which a circle whose center is a point on the link FB and whose radius is a safe distance is defined per point on the link FB of the peripheral aircraft. The circle is assumed to be parallel with the calculation plane $P_c$. As illustrated in FIG. 3, the tilted column H having the circular bottom is defined. The safe distance will be denoted as oceanic airspace in the following description.

When a link of the aircraft of interest passes within the tilted column H defined by a link of the peripheral aircraft and the oceanic airspace, the aircraft of interest will abnormally near to the peripheral aircraft. Crossing between the plane including the region $P_0$ and the tilted column H is indicated by an oval d as illustrated in FIG. 3. Crossing between the oval d and the link FA of the aircraft of interest in the 3D space indicates that abnormal nearing will occur, and no crossing indicates that abnormal nearing will not occur. In the present invention, however, the crossing determination is not made in the 3D space, but a determination is made as to whether abnormal nearing can occur by use of a region (not illustrated in FIG. 3) obtained by mapping the region $P_0$ onto the calculation plane $P_c$.

The peripheral aircraft movement plan selection means 32 maps the region $P_0$ in the 3D space onto the calculation plane $P_c$ by use of the projection matrix calculated by the geometric model generation means 30. The peripheral aircraft movement plan selection means 32 then determines whether the circle (denoted as c, see FIG. 3) in the calculation plane $P_c$ whose center is the start point of the link of the peripheral aircraft and whose radius is the oceanic airspace overlaps on the region (denoted as L) which is the mapped region $P_0$, thereby determining whether the aircraft of interest can abnormally near to the peripheral aircraft. That is, if the circle c partially overlaps on the region L in the calculation plane, the peripheral aircraft movement plan selection means 32 determines that the aircraft of interest can abnormally near to the peripheral aircraft. When the circle c does not overlap on the region L, it is determined that the aircraft of interest cannot abnormally near to the peripheral aircraft.

The circle c corresponds to a circle which is obtained by mapping the oval d in the 3D space onto the calculation plane in the direction of the link FB.

The peripheral aircraft movement plan selection means 32 performs the above processing per link pair having a common part between the times from the start point time to the end point time, selects a link of the peripheral aircraft which is determined as being able to abnormally near to the aircraft of interest, and inputs a list of links of the peripheral aircraft into the output device 5.

Figure 4:
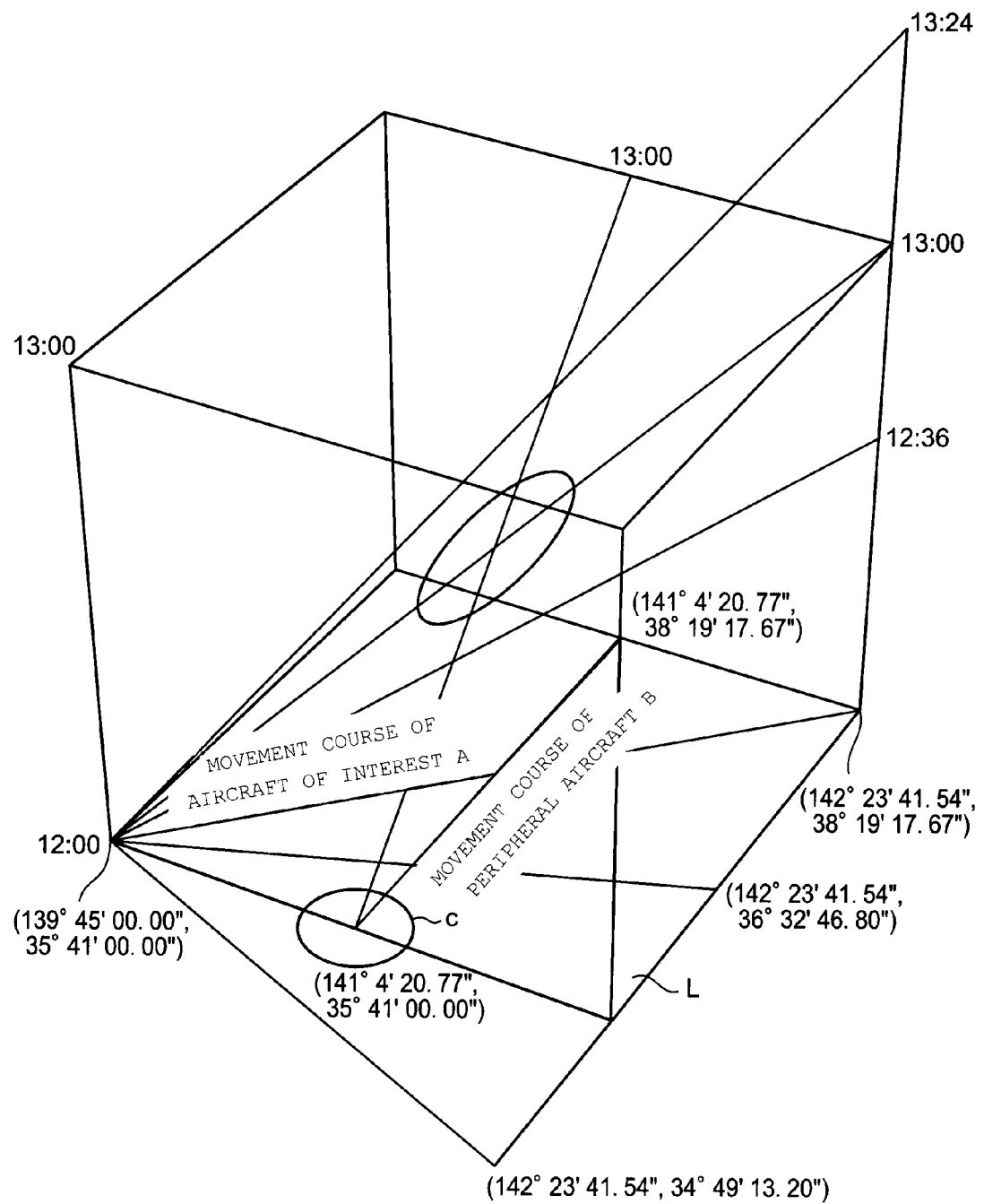
FIG. 4 It depicts a schematic diagram illustrating a specific example of determination processing by a peripheral aircraft movement plan selection means 32.

FIG. 4 is a schematic diagram illustrating a specific example of the determination processing by the peripheral aircraft movement plan selection means 32. FIG. 4 illustrates a 3D space in which the temporal axis is added to the movement plane of the moving bodies similarly as in FIG. 3. The departure position of the aircraft of interest is assumed as the original point and can be obtained by basic affine transformation. The aircraft of interest A starts at the point (139°45'00.00", 35°41'00.00") at 12:00, and arrives at the point (142°23'41.54", 38°19'17.67") at 13:00. The peripheral aircraft B starts at the point (141°4'20.77", 35°41'00.00") at 12:00 and arrives at the point (141°4'20.77", 38°19'17.67") at 13:00. When the aircraft of interest moves at an upper limit speed, it arrives at the point (142°23'41.54", 38°19'17.67") at 12:36. When the aircraft of interest moves at a lower limit speed, it arrives there at 13:24.

The coordinates (142°23'41.54", 38°19'17.67", 12:36) and (142°23'41.54", 38°19'17.67", 13:24) in the 3D space are mapped onto the calculation plane, respectively. The coordinates on the calculation plane are (142°23'41.54", 36°32'46.80") and (142°23'41.54", 34°49'13.20"), respectively. The peripheral aircraft movement plan selection means 32 determines the presence of a common part (overlap) between the region L surrounded by the line segments connecting the mapped coordinates and the start point (139°45'00.00", 35°41'00.00") of the link FA of the aircraft of interest, and the circle c whose center is the departure point of the peripheral aircraft B and whose radius is the oceanic airspace, thereby determining whether the aircraft of interest A can abnormally near to the peripheral aircraft B along with a change in speed of the aircraft of interest A.

When being input with a link pair, the geometric model generation means 30 determines whether a common part is present between the times from the start point time to the end point time in the link pair, and calculates a projection matrix indicating mapping from the 3D space onto the calculation plane by use of the link pair under the condition that a common part is present.

The output device 5 outputs the input information. An output form of the output device 5 is not limited. For example, the output device 5 may be a display device for display output.

The link creation means 31, the peripheral aircraft movement plan selection means 32 and the geometric model generation means 30 are realized by the CPU in a computer operating according to a movement-measurement-processing program, for example. For example, the CPU reads the movement-measurement-processing program from a computer readable recording medium recording the movement-measurement-processing program therein, and may operate as the link creation means 31, the peripheral aircraft movement plan selection means 32 and the geometric model generation means 30 according to the program. The link creation means 31, the peripheral aircraft movement plan selection means 32 and the geometric model generation means 30 may be realized in individual hardware.

Figure 5:
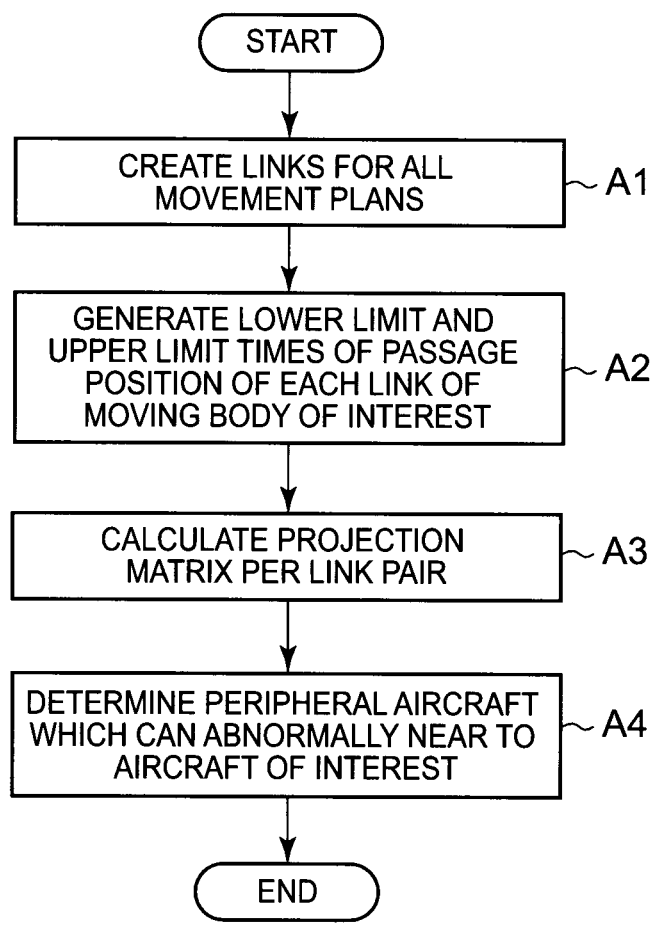
FIG. 5 It depicts a flowchart illustrating exemplary processing progress according to the first exemplary embodiment of the present invention.

Processing progress according to the first exemplary embodiment will be described below. FIG. 5 is a flowchart illustrating exemplary processing progress according to the first exemplary embodiment of the present invention. The aircraft-of-interest movement plan input device 1 is input with an aircraft-of-interest movement plan from the manager of the movement-measurement-processing system. The aircraft-of-interest movement plan input device 1 sends the aircraft-of-interest movement plan to the link creation means 31. Further, the peripheral aircraft movement plan input device 2 is input with a peripheral aircraft movement plan of each peripheral moving body from the manager. The peripheral aircraft movement plan input device 2 sends the peripheral aircraft movement plans to the link creation means 31.

The link creation means 31 creates a set of links per movement plan for all the input movement plans (the aircraft-of-interest movement plan and all the peripheral aircraft movement plans) (step A1).

The link creation means 31 then reads the upper limit speed and the lower limit speed of the moving bodies from the movement condition storage unit 42, and calculates a lower limit arrival time and an upper limit arrival time of the aircraft of interest when it passes through the end point of each link (step A2). That is, the link creation means 31 calculates the arrival time (lower limit arrival time) to the end point of a link when the aircraft of interest starting at the position indicated by the start point of the link at the start point time moves at the upper limit speed. Similarly, the link creation means 31 calculates the arrival time (upper limit arrival time) to the end point of the link when the aircraft of interest starting at the position indicated by the start point of the link at the start point time moves at the lower limit speed.

The peripheral aircraft movement plan selection means 32 then extracts a link pair including one link of the aircraft of interest and one link of a peripheral aircraft which have a common part in the times from the start point time to the end point time. The peripheral aircraft movement plan selection means 32 inputs the link pairs into the geometric model generation means 30. The geometric model generation means 30 calculates a projection matrix indicating mapping from the 3D space onto the calculation plane based on the link pairs for each input link pair (step A3). Exemplary calculations of a projection matrix will be described later. The geometric model generation means 30 returns each projection matrix corresponding to each link pair to the peripheral aircraft movement plan selection means 32.

The peripheral aircraft movement plan selection means 32 selects a link in ascending order of time indicated by the link pairs per peripheral aircraft. The peripheral aircraft movement plan selection means 32 then maps the region $P_0$ surrounded by the start point coordinate of the link of the aircraft of interest and the points corresponding to the lower limit arrival time and the upper limit arrival time for the selected link pair onto the calculation plane. The peripheral aircraft movement plan selection means 32 further determines whether the mapped region L overlaps on the circle c whose center is the start point of the link of the peripheral aircraft and whose radius is the oceanic airspace in the calculation plane $P_c$, thereby determining whether the aircraft of interest can abnormally near to the peripheral aircraft. The peripheral aircraft movement plan selection means 32 performs the determination processing on each link pair for each peripheral aircraft (step A4).

The peripheral aircraft movement plan selection means 32 inputs a link of the peripheral aircraft determined as being able to abnormally near to the aircraft of interest into the output device 5, and the output device 5 outputs the link.

The operations of the present exemplary embodiment will be described below by use of specific examples. The following specific examples will assume that a course of the aircraft of interest and a course of the peripheral aircraft are neither on the same straight line nor parallel with each other. One link will be assumed to be indicated in a form of [(x coordinate of start point, y coordinate of start point, t coordinate of start point), (x coordinate of end point, y coordinate of end point, t coordinate of end point)].

A set of links of the aircraft of interest created from the aircraft-of-interest movement plan is assumed to include the link $FP_A$=[(139°45'00.00", 35°41'00.00", 12:00), (142°23'41.54", 38°19'17.67", 13:00)].

A set of links created from the peripheral aircraft movement plan of the peripheral aircraft B is assumed to include the link $FP_B$=[(141°4'20.77", 35°41'00.00", 12:00), (141°4'20.77", 38°19'17.67", 13:00)].

Similarly, a set of links created from the peripheral aircraft movement plan of the peripheral aircraft C is assumed to include the link $FP_C$=[(141°43'46.08", 35°41'00.00", 12:00), (141°43'46.08", 38°58'52.09", 13:00)].

Similarly, a set of links created from the peripheral aircraft movement plan of the peripheral aircraft D is assumed to include the link $FP_D$=[(142°23'41.54", 35°41'00.00", 12:00), (142°23'41.54", 76°38'35.34", 13:00)].

Figure 6:
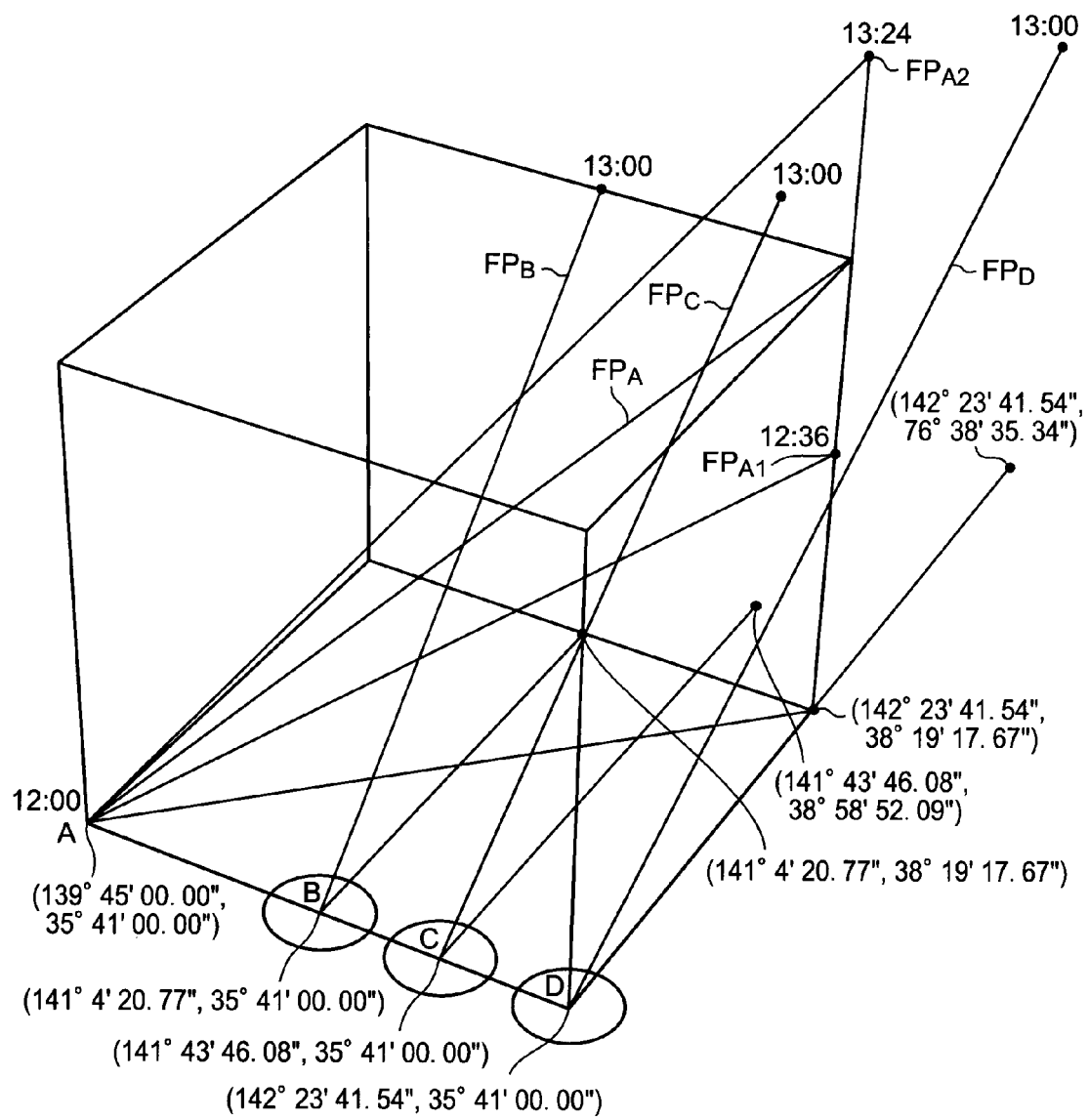
FIG. 6 It depicts a schematic diagram illustrating links $FP_A$, $FP_B$, $FP_C$ and $FP_D$ in a 3D space.

FIG. 6 is a schematic diagram illustrating the links $FP_A$, $FP_B$, $FP_C$ and $FP_D$ in the 3D space. In the present example, the movement condition storage unit 42 is assumed to store an oceanic airspace of "24 km", an upper limit speed of "640 km/h" and a lower limit speed of "240 km/h" therein.

The link creation means 31 creates a set of links per movement plan (step A1). The description will be made herein in terms of the link $FP_A$ of the aircraft of interest A, and the links $FP_B$, $FP_C$ and $FP_D$ of the peripheral aircrafts B, C and D.

The link creation means 31 reads the upper limit speed and the lower limit speed of the moving bodies from the movement condition storage unit 42, and calculates a lower limit arrival time and an upper limit arrival time for the link $FP_A$ (step A2). In the present example, the lower limit arrival time is calculated at 12:36 and the upper limit arrival time is calculated at 13:24. The link creation means 31 inputs a set of links created per moving body and the calculated lower limit arrival time and upper limit arrival time into the peripheral aircraft movement plan selection means 32.

A common part is present between the link $FP_A$ of the aircraft of interest A and each link $FP_B$, $FP_C$ or $FP_D$ of a peripheral aircraft. Thus, the peripheral aircraft movement plan selection means 32 inputs the link pairs such as ($FP_A$, $FP_B$), ($FP_A$, $FP_C$) and ($FP_A$, $FP_D$) into the geometric model generation means 30.

The geometric model generation means 30 calculates a projection matrix indicating mapping from the 3D space onto the calculation plane per link pair having a common part between the times from the start point to the end point (step A3). The projection matrix will be denoted as m below.

The link of the aircraft of interest in a link pair is generally denoted as FA=[$(x_{A1}, y_{A1}, t_{A1}), (x_{A2}, y_{A2}, t_{A2})$]. That is, the x coordinate at the start point of the link FA is indicated as $x_{A1}$, the y coordinate is indicated as $y_{A1}$, and the time when the aircraft of interest passes through the position is indicated as $t_{A1}$. Then, the x coordinate at the end point of the link FA is indicated as $x_{A2}$, the y coordinate is indicated as $y_{A2}$, and the time when the aircraft of interest passes through the position is indicated as $t_{A2}$.

Similarly, the link of the peripheral aircraft in a link pair is generally indicated as FB=[($x_{B1}$, $y_{B1}$, $t_{B1}$), ($x_{B2}$, $y_{B2}$, $t_{B2}$)]. That is, the x coordinate at the start point of the link FB is indicated as $x_{B1}$, the y coordinate is indicated as $y_{B1}$, and the time when the peripheral aircraft passes through the position is indicated as $t_{B1}$. Then, the x coordinate at the end point of the link FB is indicated as $x_{B2}$, the y coordinate is indicated as $y_{B2}$, and the time when the peripheral aircraft passes through the position is indicated as $t_{B2}$.

When the course of the aircraft of interest and the course of the peripheral aircraft are neither on the same straight line nor parallel with each other, the geometric model generation means 30 can find the projection matrix m indicating mapping from the 3D space onto the calculation plane by calculating the following Equation (1).

[Mathematical formula 1]

$$m = \begin{pmatrix} 1 & 0 & \frac{y_{A2}-y_{A1}}{t_{A2}-t_{A1}} & -\frac{y_{A2}-y_{A1}}{t_{A2}-t_{A1}}t_{A1} \\ 0 & 1 & -\frac{x_{A2}-x_{A1}}{t_{A2}-t_{A1}} & \frac{x_{A2}-x_{A1}}{t_{A2}-t_{A1}}t_{A1} \\ 0 & 0 & 0 & t_{A1} \end{pmatrix} \quad \text{Equation (1)}$$

The geometric model generation means 30 returns each projection matrix m calculated per link pair to the peripheral aircraft movement plan selection means 32. The geometric model generation means 30 maps, onto the calculation plane, the region $P_0$ surrounded by the start point of the link $FP_A$ (assumed as $FP_{A0}$), the point $FP_{A1}$ (see FIG. 6) having the coordinate values of the x and y coordinates at the end point of the link $FP_A$ and the lower limit arrival time, and the point $FP_{A2}$ (see FIG. 6) having the coordinate values of the x and y coordinates at the end point of the link $FP_A$ and the upper limit arrival time per link pair. With the mapping, the points $FP_{A1}$ and $FP_{A2}$ are mapped on the calculation plane, and a triangle surrounded by the two resultant mapped points and the point having the coordinate values of the x and y coordinates of the start point of the link $FP_A$ may be derived.

There will be described calculations for mapping the points $FP_{A1}$ and $FP_{A2}$ in the 3D space onto the calculation plane. The description will be made herein by way of a case in which a determination is made as to whether abnormal nearing will occur between the aircraft of interest A and the peripheral aircraft B by use of a link pair ($FP_A$, $FP_B$). As described above, a link of the aircraft of interest is generally denoted as [($x_{A1}$, $y_{A1}$, $t_{A1}$), ($x_{A2}$, $y_{A2}$, $t_{A2}$)]. At this time, the point $FP_{A1}$ can be denoted as ($x_{A2}$, $y_{A2}$, $t_{Amin}$). $t_{Amin}$ indicates the lower limit arrival time. The point $FP_{A2}$ can be denoted as ($x_{A2}$, $y_{A2}$, $t_{Amax}$). $t_{Amax}$ indicates the upper limit arrival time.

The first row in the projection matrix m is denoted as m1 and the second row in the projection matrix is denoted as m2. The projection matrix m calculated for the link pair ($FP_A$, $FP_B$) is used herein.

When mapping the point $FP_{A1}$, the peripheral aircraft movement plan selection means 32 maps it to a point having the x coordinate which is an inner product of ($x_{A2}$, $y_{A2}$, 0, 1) and m1 (the first row in the projection matrix m) and the y coordinate which is an inner product of ($x_{A2}$, $y_{A2}$, $t_{Amin}$, 1) and m2 (the second row in the projection matrix m). When mapping the point $FP_{A2}$, similar calculations may be made by use of $t_{Amax}$ instead of $t_{Amin}$.

As a result, the peripheral aircraft movement plan selection means 32 can specify a triangle in the calculation plane whose vertexes are the start point of the link $FP_A$ (the point ($x_{A1}$, $y_{A1}$) in the calculation plane) and the two points acquired by mapping the points $FP_{A1}$ and $FP_{A2}$.

Specifically, (142°23′41.54″, 36°32′46.80″) indicated in FIG. 4 is obtained by the mapped point $FP_{A1}$, and (142°23′41.54″, 34°49′13.20″) indicated in FIG. 4 is obtained by the mapped point $FP_{A2}$. Then, the triangle region L indicated in FIG. 4 can be specified in the calculation plane.

The peripheral aircraft movement plan selection means 32 determines the presence of an overlap between the circle whose center is the departure point of the peripheral aircraft B and whose radius is the oceanic airspace and the triangle region L, thereby determining whether the aircraft of interest A can abnormally near to the peripheral aircraft B. In the present example, the circle is contained in the triangle region L. Thus, the peripheral aircraft movement plan selection means 32 determines that the aircraft of interest A can abnormally near to the peripheral aircraft B (step A4).

Figure 7:
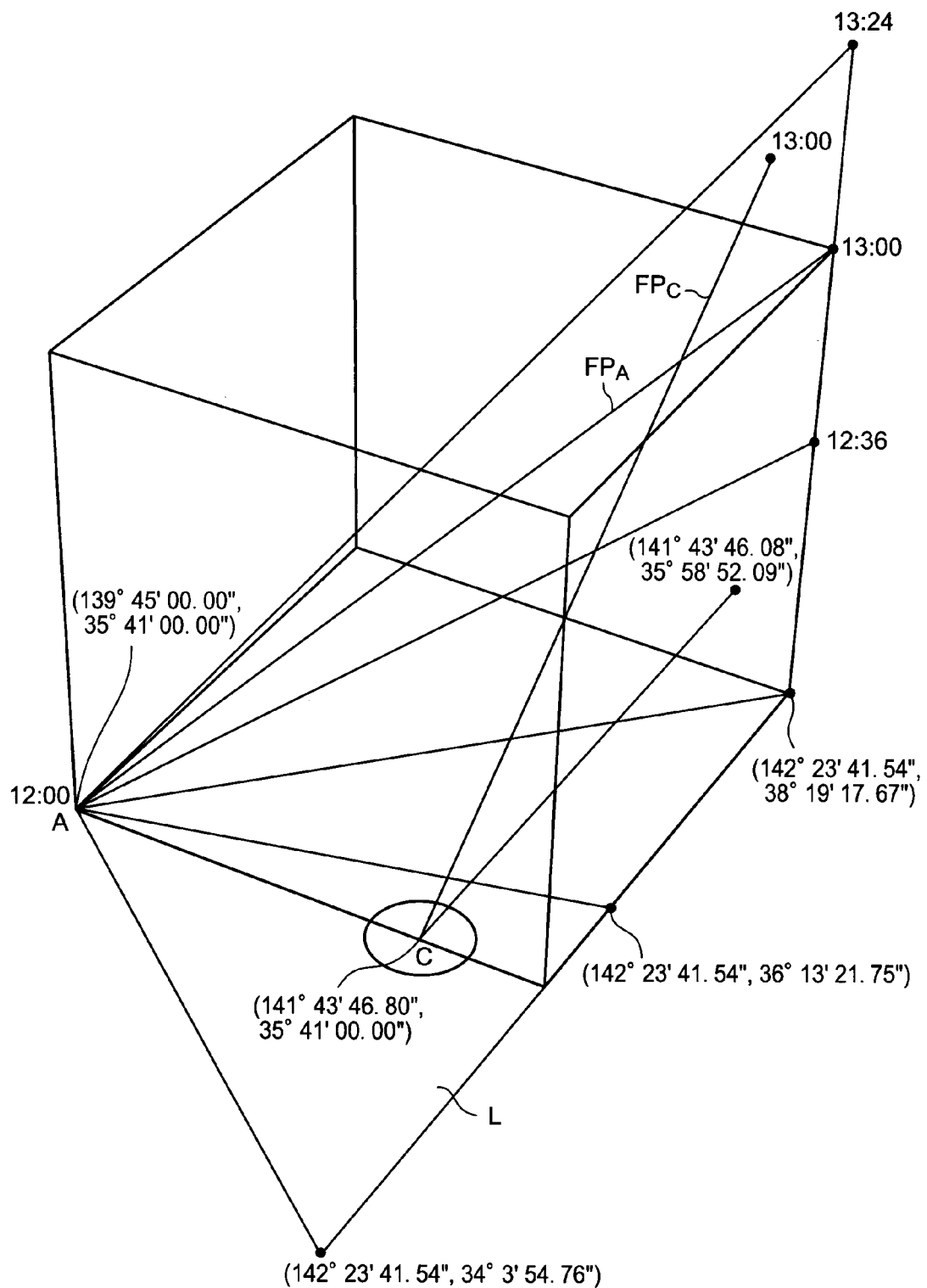
FIG. 7 It depicts a schematic diagram illustrating a region L.
Figure 8:
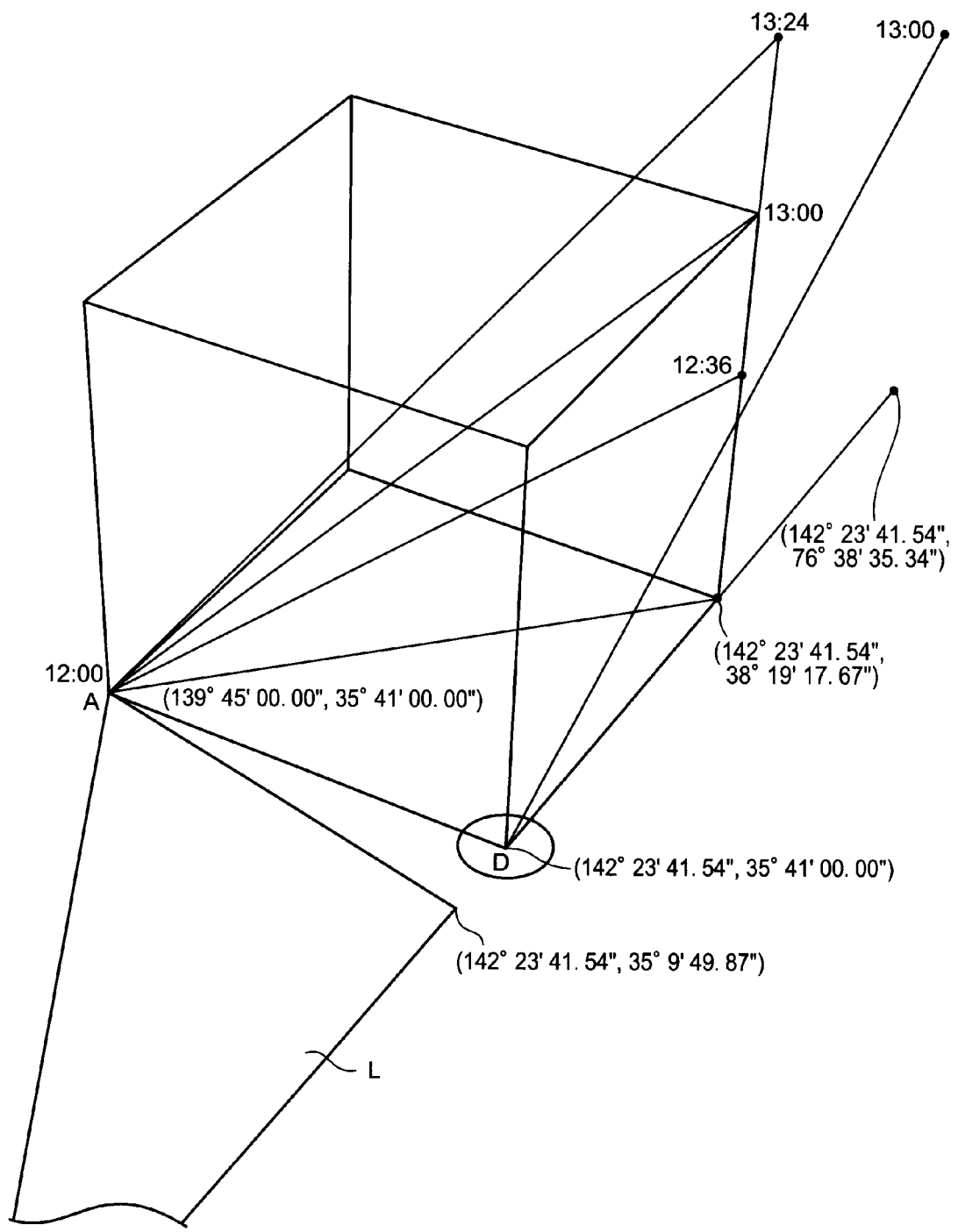
FIG. 8 It depicts a schematic diagram illustrating the region L.

The peripheral aircraft movement plan selection means 32 performs the same determination processing on the peripheral aircrafts C and D. FIG. 7 is a schematic diagram illustrating the region L for determining the presence of abnormal nearing between the aircraft of interest A and the peripheral aircraft C by use of ($FP_A$, $FP_C$). FIG. 8 is a schematic diagram illustrating the region L for determining the presence of abnormal nearing between the aircraft of interest A and the peripheral aircraft D by use of ($FP_A$, $FP_D$).

As illustrated in FIG. 7, the determination for the peripheral aircraft C is that the circle is contained in the region L. Thus, the peripheral aircraft movement plan selection means 32 determines that the aircraft of interest A can abnormally near to the peripheral aircraft C. As illustrated in FIG. 8, the determination for the peripheral aircraft D is that the region L does not overlap on the circle. Thus, the peripheral aircraft movement plan selection means 32 determines that the aircraft of interest A cannot abnormally near to the peripheral aircraft D.

Thus, in the present example, the peripheral aircraft movement plan selection means 32 sends the links $FP_B$ and $FP_C$ to the output device 5, and the output device 5 outputs the links $FP_B$ and $FP_C$ of the peripheral aircrafts B and C.

According to the present exemplary embodiment, the peripheral aircraft movement plan selection means 32 maps the region $P_o$ defined by the start point of a link of the aircraft of interest, a point corresponding to the lower limit arrival time, and a point corresponding to the upper limit arrival time in the 3D space including the temporal axis onto the calculation plane. The peripheral aircraft movement plan selection means 32 then determines whether the aircraft of interest can abnormally near to the peripheral aircraft depending on whether the circle c in the calculation plane whose center is the start point of a link of the peripheral aircraft and whose radius is the oceanic airspace overlaps on the region L obtained by the mapping. That is, according to the present invention, whether the aircraft of interest can abnormally near to a peripheral aircraft does not need to be determined per time, and the presence of an overlap between the regions on the calculation plane is determined thereby to determine whether the aircraft of interest can abnormally near to the peripheral aircraft. The mapping from the 3D space onto the calculation plane can be performed by simple matrix calculations. Thus, the presence of possible abnormal nearing between the aircraft of interest and a peripheral aircraft can be quickly determined. As a result, a peripheral aircraft which can abnormally near to the aircraft of interest can be quickly specified.

A variant of the first exemplary embodiment will be described below.

The peripheral aircraft movement plan selection means 32 uses the first row (m1) and the second row (m2) in the projection matrix m for mapping the region $P_0$ onto the calculation plane. Thus, the geometric model generation means 30 may return only the first row and second row in the calculated projection matrix m to the peripheral aircraft movement plan selection means 32.

The above exemplary embodiment has been described by way of the case in which the start point time of a link of the aircraft of interest is common with the start point time of a link of the peripheral aircraft. When the start point times of the two links in a link pair of the aircraft of interest and a peripheral aircraft are different from each other, the link start point coordinate (x, y, t) at the earlier start point time may be replaced in the processing in steps A3 and A4 for convenience. Specifically, the link start point coordinate (x, y, t) at the earlier start point time may be replaced such that the start point time is the same as the start point time of the other link. For example, it is assumed that the link FA=[($x_{A1}$, $y_{A1}$, $t_{A1}$), ($x_{A2}$, $y_{A2}$, $t_{A2}$)] of the aircraft of interest and the link FB=[($x_{B1}$, $y_{B1}$, $t_{B1}$), ($x_{B2}$, $y_{B2}$, $t_{B2}$)] of a peripheral aircraft are given. When $t_{A1}$ is earlier than $t_{B1}$, the geometric model generation means 30 replaces the start point of the link FA with the cross point coordinate between the link FA and the calculation plane (t=$t_{B1}$) and may calculate the projection matrix m by use of the start point. The peripheral aircraft movement plan selection means 32 then assumes the cross point between the link FA and the calculation plane (t=$t_{B1}$) as the start point of the link FA, and may assume the point as one vertex of the region L. In this case, the link creation means 31 may recalculate the lower limit arrival time and the upper limit arrival time based on the replaced start point of the link FA. When $t_{B1}$ is earlier than $t_{A1}$, the cross point coordinate between the link FB and the calculation plane (t=$t_{A1}$) is assumed as the start point of the link FB, and the circle c on the calculation plane whose center is the cross point and whose radius is the oceanic airspace may be defined. Other operations are the same as in the first exemplary embodiment.

Second Exemplary Embodiment

According to a second exemplary embodiment of the present invention, a determination is made as to whether the aircraft of interest will abnormally near to a peripheral aircraft for the peripheral aircraft determined as being able to abnormally near to the aircraft of interest in the same processing as in the first exemplary embodiment. Then, when a peripheral aircraft which can abnormally near to the aircraft of interest is present, the movement plan of the aircraft of interest is changed to avoid the abnormal nearing.

Figure 9:
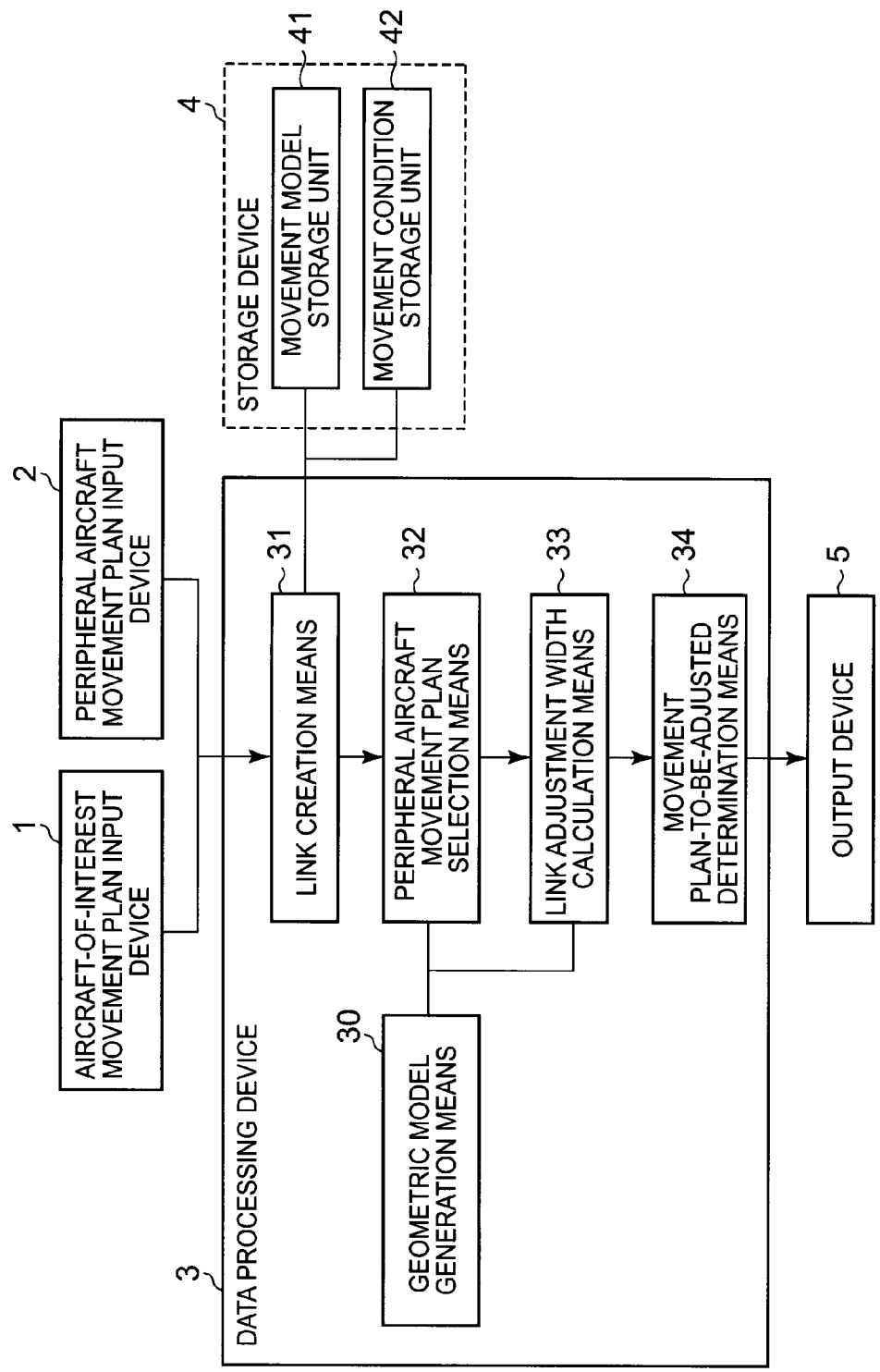
FIG. 9 It depicts a block diagram illustrating an exemplary structure of a movement-measurement-processing system according to a second exemplary embodiment of the present invention.

FIG. 9 is a block diagram illustrating an exemplary structure of the movement-measurement-processing system according to the second exemplary embodiment of the present invention. The same components as the components in the first exemplary embodiment are denoted with the same reference numerals as in FIG. 1, and a detailed description thereof will be omitted. In the second exemplary embodiment, the data processing device 3 includes the link creation means 31, the peripheral aircraft movement plan selection means 32, the geometric model generation means 30, a link adjustment width calculation means 33 and a movement plan-to-be-adjusted determination means 34.

In the second exemplary embodiment, the geometric model generation means 30 calculates not only a projection matrix m indicating mapping from the 3D space onto the calculation plane but also a projection matrix (denoted as M) indicating its inverse mapping (mapping from the calculation plane into the 3D space). The second exemplary embodiment will be also described by way of the case in which the course of the aircraft of interest and the course of a peripheral aircraft are neither on the same straight line nor parallel with each other.

The link of the aircraft of interest in a link pair is generally denoted as FA=[($x_{A1}$, $y_{A1}$, $t_{A1}$) ($x_{A2}$, $y_{A2}$, $t_{A2}$)], and the link of the peripheral aircraft in a link pair is generally denoted as FB=[($x_{B1}$, $y_{B1}$, $t_{B1}$), ($x_{B2}$, $y_{B2}$, $t_{B2}$)]. In this case, the geometric model generation means 30 can calculate the projection matrix m indicating mapping from the 3D space onto the calculation plane by calculating the aforementioned Equation (1). Further, the geometric model generation means 30 can find the projection matrix M indicating its inverse mapping by calculating the following Equation (2).

[Mathematical formula 1]

$$M = \begin{pmatrix} 1 - \frac{(y_{A2}-y_{A1})^2}{(x_{A2}-x_{A1})^2 + (y_{A2}-y_{A1})^2} & \frac{(x_{A2}-x_{A1})(y_{A2}-y_{A1})}{(x_{A2}-x_{A1})^2 + (y_{A2}-y_{A1})^2} & 0 - \frac{(y_{A2}-y_{A1})}{(x_{A2}-x_{A1})^2 + (y_{A2}-y_A)^2} \begin{vmatrix} x_{A2}-x_{A1} & y_{A2}-y_{A1} \\ x_{A1} & y_{A1} \end{vmatrix} \\ \frac{(y_{A2}-y_{A1})(x_{A2}-x_{A1})}{(x_{A2}-x_{A1})^2 + (y_{A1}-y_{A1})^2} & 1 - \frac{(x_{A2}-x_{A1})^2}{(x_{A2}-x_{A1})^2 + (y_{A2}-y_{A1})^2} & 0 \frac{(x_{A2}-x_{A1})}{(x_{A2}-x_{A1})^2 + (y_{A2}-y_{A1})^2} \begin{vmatrix} x_{A2}-x_{A1} & y_{A2}-y_{A1} \\ x_{A1} & y_{A1} \end{vmatrix} \\ \frac{(t_{A2}-t_{A1})(y_{A2}-y_{A1})}{(x_{A2}-x_{A1})^2 + (y_{A2}-y_{A1})^2} & -\frac{(t_{A2}-t_{A1})(x_{A2}-x_{A1})}{(x_{A2}-x_{A1})^2 + (y_{A2}-y_{A1})^2} & 1 \frac{(t_{A2}-t_{A1})}{(x_{A2}-x_{A1})^2 + (y_{A2}-y_{A1})^2} \begin{vmatrix} x_{A2}-x_{A1} & y_{A2}-y_{A1} \\ x_{A1} & y_{A1} \end{vmatrix} \end{pmatrix}$$

Equation (2)

In the present exemplary embodiment, the peripheral aircraft movement plan selection means 32 inputs a list of links of a peripheral aircraft determined as being able to abnormally near to the aircraft of interest into the link adjustment width calculation means 33. Further, the peripheral aircraft movement plan selection means 32 inputs the links of the aircraft of interest paired with the links into the link adjustment width calculation means 33. The link adjustment with calculation means 33 determines whether the aircraft of interest will abnormally near to the peripheral aircraft based on the links input from the peripheral aircraft movement plan selection means 32, and when abnormal nearing will occur, calculates a speed of the aircraft of interest for avoiding the abnormal nearing. The link adjustment width calculation means 33 may determine that abnormal nearing cannot be avoided.

Figure 10:
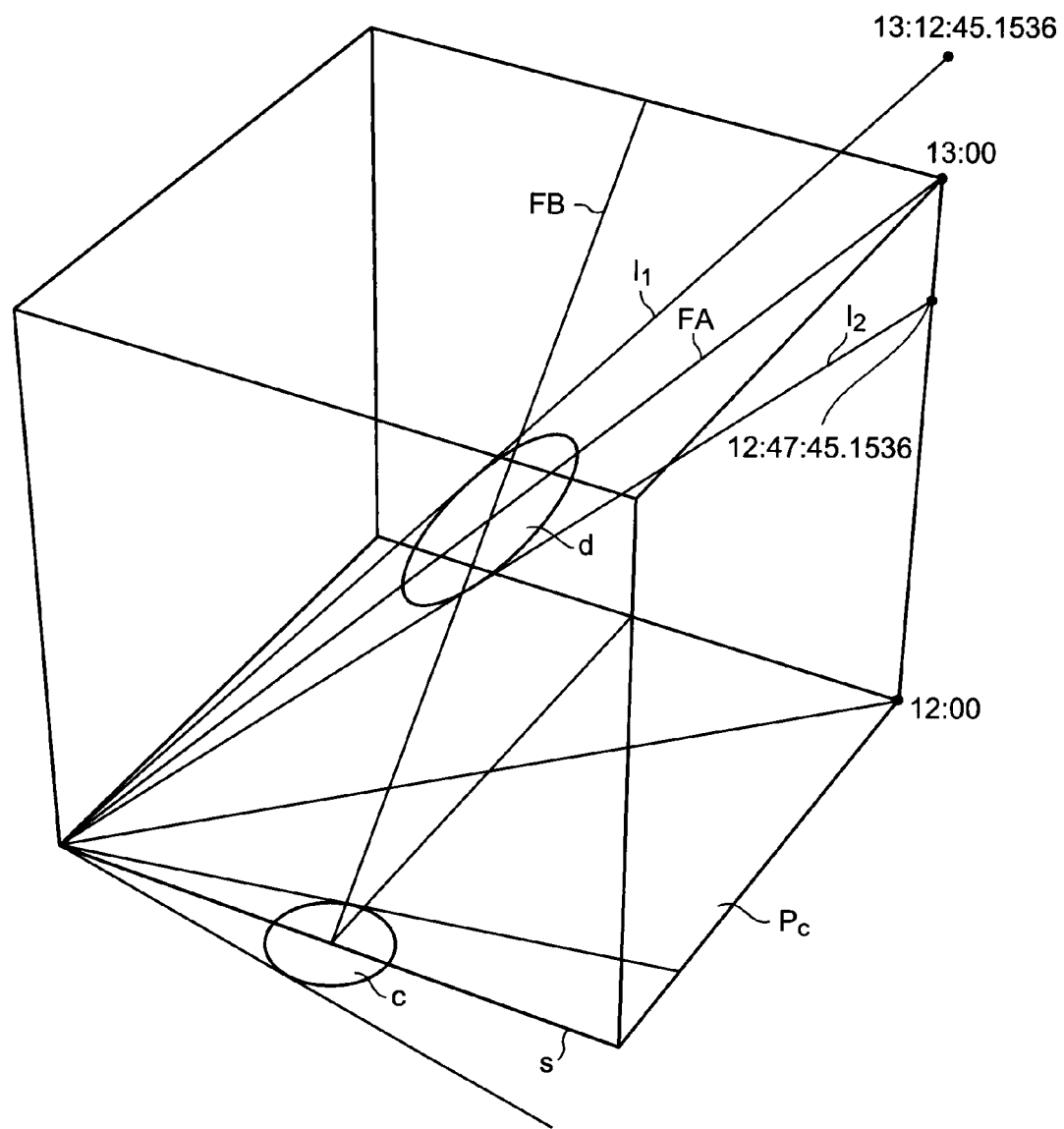
FIG. 10 It depicts a schematic diagram geometrically illustrating how to calculate an abnormal nearing avoidance speed.

FIG. 10 is a schematic diagram geometrically illustrating how to calculate an abnormal nearing avoidance speed. FIG. 10 illustrates the link FA of the aircraft of interest and the link FB of a peripheral aircraft similar to those in FIG. 3. The start point time of FA and FB is 12:00 and the end point time of FA and FB is 13:00. In the present example, the aircraft of interest and the peripheral aircraft are assumed to crash at 12:24.

As described in the first exemplary embodiment, the oval d is a cross between the plane defined by changing the speed of the aircraft of interest and the tilted column H (see FIG. 3) defined by the link FB of the peripheral aircraft and the oceanic airspace. Then, the circle c corresponds to a circle obtained by mapping the oval d in the 3D space onto the calculation plane in the direction of the link FB. The circle c can be defined as a circle whose center is the start point of the link of the peripheral aircraft and whose radius is the oceanic airspace in the calculation plane even if the oval d is not mapped.

The link adjustment width calculation means 33 finds tangent lines passing through the start point of the link FA and contacting with the circle c. Then, the points of contact between the tangent lines and the circle c are mapped into the 3D space, and a speed (avoidance speed) of the aircraft of interest for avoiding abnormal nearing is calculated based on the start point of the link of the aircraft of interest and the tilted straight lines ($l_1$ and $l_2$ indicated in FIG. 10) passing through the start point. $l_1$ and $l_2$ contact with the oval d.

In the example illustrated in FIG. 10, when the aircraft of interest moves at a speed to cause the arrival time to be earlier than 12:47:45.1536, abnormal nearing between the aircraft of interest and the peripheral aircraft can be avoided. Also when the aircraft of interest moves at a speed to cause the arrival time to be later than 13:12:45.1536, abnormal nearing between the aircraft of interest and the peripheral aircraft can be avoided.

The link adjustment width calculation means 33 calculates an avoidance speed and repeatedly determines whether movement is possible at the speed, thereby determining a speed not to cause abnormal nearing to any peripheral aircraft. The determination that abnormal nearing cannot be avoided may be made.

The movement plan-to-be-adjusted determination means 34 refers to the avoidance speed of the aircraft of interest calculated by the link adjustment width calculation means 33, scans each link after the link of the aircraft of interest determined as being able to abnormally near to the peripheral aircraft in time sequence based on the avoidance speed, and corrects the passage times (the start point time and end point time of the link) of the aircraft of interest.

The link adjustment width calculation means 33 and the movement plan-to-be-adjusted determination means 34 are realized by the CPU in a computer operating according to the movement-measurement-processing program, for example. The link adjustment width calculation means 33 and the movement plan-to-be-adjusted determination means 34 may be realized by different hardware from other components.

Figure 11:
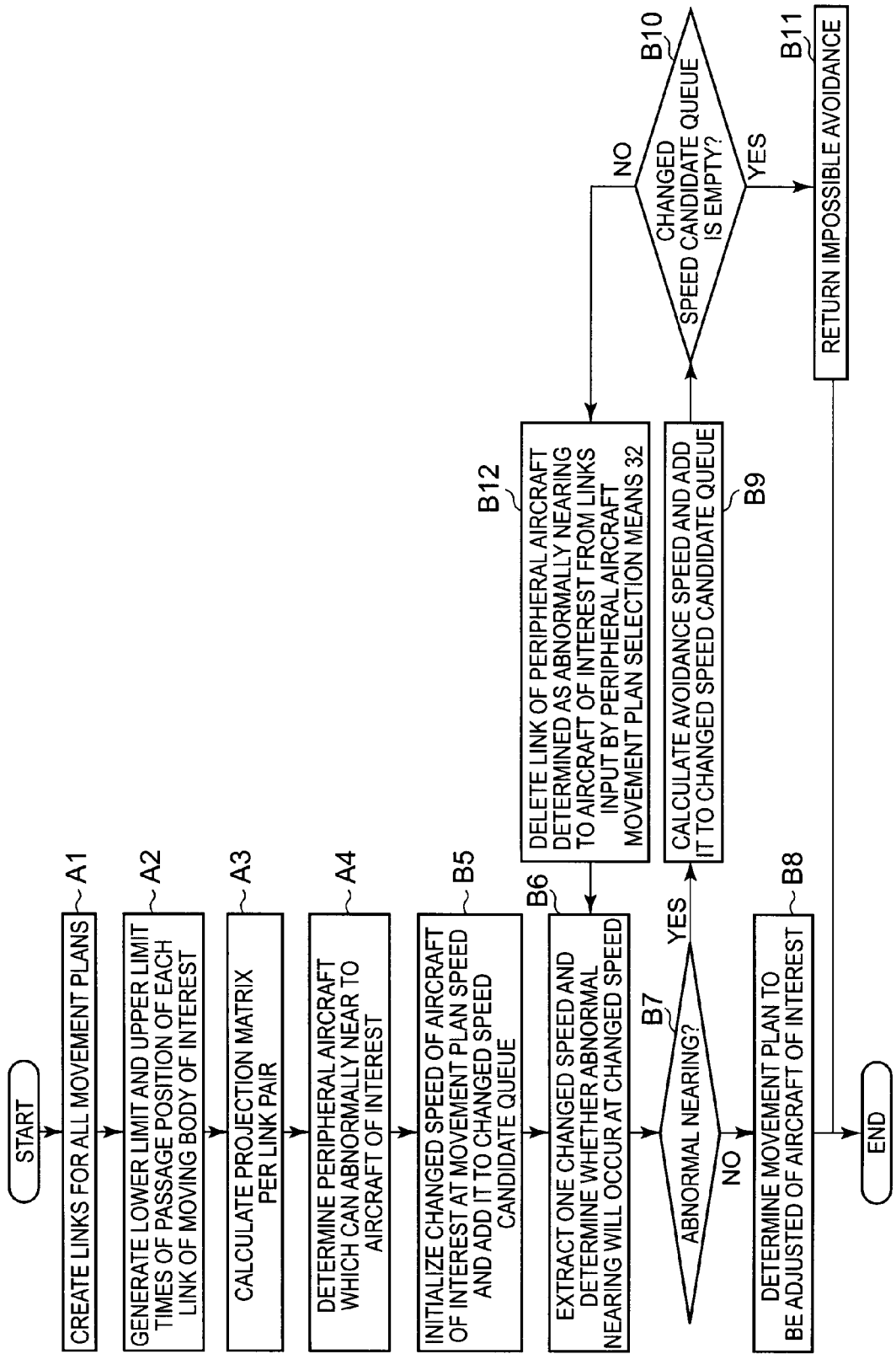
FIG. 11 It depicts a flowchart illustrating exemplary processing progress according to the second exemplary embodiment of the present invention.

Processing progress according to the second exemplary embodiment will be described below. FIG. 11 is a flowchart illustrating exemplary processing progress according to the second exemplary embodiment of the present invention. The processing in steps A1 to A4 are the same as those in the first exemplary embodiment, and a description thereof will be omitted. In the present exemplary embodiment, the geometric model generation means 30 calculates not only a projection matrix m but also a projection matrix M indicating mapping from the calculation plane into the 3D space in step A3. The peripheral aircraft movement plan selection means 32 inputs a list of links of a peripheral aircraft determined as being able to abnormally near to the aircraft of interest into the link adjustment width calculation means 33 in step A4. The peripheral aircraft movement plan selection means 32 inputs the links of the aircraft of interest paired with the links into the link adjustment width calculation means 33.

It will be assumed below also in the present exemplary embodiment that the start point times of a link of the aircraft of interest and a link of each peripheral aircraft are common for simplified description.

The link adjustment width calculation means 33 calculates a speed of the aircraft of interest in an input link of the aircraft of interest, for example. The speed is an original movement speed of the aircraft of interest when the aircraft of interest moves according to the aircraft-of-interest movement plan. The link adjustment width calculation means 33 initializes a changed speed of the aircraft of interest (which will be denoted as changed speed below) by the original speed of the aircraft of interest, and adds it to the changed speed candidate queue (step B5). For example, when the aircraft of interest moves from the point (139°45'00.00", 35°41'00.00") to the point (142°23'41.54", 38°19'17.67") in one hour, the movement speed of the aircraft of interest is 340 (km/h). In this case, the link adjustment width calculation means 33 adds the changed speed of 340 (km/h) to the changed speed candidate queue, and initializes the changed speed candidate queue to {340 (km/h)}. After step B5, the processing proceeds to step B6.

In step B6, the link adjustment width calculation means 33 extracts one changed speed from the changed speed candidate queue. The link adjustment width calculation means 33 deletes the extracted changed speed from the changed speed candidate queue. The link adjustment width calculation means 33 determines whether the aircraft of interest will abnormally near to a peripheral aircraft by use of a link of the aircraft of interest and a link of the individual peripheral aircraft during movement at the extracted changed speed (step B6). For example, when extracting exemplary 340 (km/h), the link adjustment width calculation means 33 performs the determination processing in step B6 by use of the link of the aircraft of interest and the link of the peripheral aircraft used for deriving 340 (km/h). In step B6, the determination processing is performed per link of each peripheral aircraft.

The determination in step B6 is not as to whether the aircraft of interest can abnormally near to a peripheral aircraft but as to whether the aircraft of interest will abnormally near to a peripheral aircraft. Thus, the link adjustment width calculation means 33 determines whether the aircraft of interest will abnormally near to a peripheral aircraft not by determining how the region L crosses with the circle c but by mapping a link of the aircraft of interest from the 3D space onto the calculation plane and determining how a line segment obtained by the mapping crosses with the circle c. When the line segment crosses with the circle c, the link adjustment width calculation means 33 determines that abnormal nearing will occur, and when the line segment does not cross with the circle c, determines that abnormal nearing will not occur.

Mapping a link of the aircraft of interest from the 3D space onto the calculation plane will be described. A link of the aircraft of interest is assumed to be denoted as $FA=[(x_{A1}, y_{A1}, t_{A1}) (x_{A2}, y_{A2}, t_{A2})]$. In this case, a resultant line segment of the mapped link FA can be defined as follows. The link adjustment width calculation means 33 assumes $(x_{A1}, y_{A1})$ as the start point of the line segment. The link adjustment width calculation means 33 assumes, as the end point of the line segment s, the point having the x coordinate which is an inner product of $(x_{A2}, y_{A2}, 0, 1)$ and m1 (the first row in the projection matrix m) and the y coordinate which is an inner products of $(x_{A2}, y_{A2}, t_{A2}, 1)$ and m2 (the second row in the projection matrix m).

A link of a peripheral aircraft is assumed to be denoted as $FB=[(x_{B1}, y_{B1}, t_{B1}), (x_{B2}, y_{B2}, t_{B2})]$. The circle c is a circle whose center is $(x_{B1}, y_{B1})$ and whose radius is the oceanic airspace on the calculation plane.

It is assumed that the link FA illustrated in FIG. 10 is the link $FP_A$ illustrated in FIG. 6 and the link FB illustrated in FIG. 10 is the link $FP_B$ illustrated in FIG. 6. Then, the line segment s and the circle c are as illustrated in FIG. 10. Specifically, the line segment s has the extreme points (139°45'00.00", 35°41'00.00") and (142°23'41.54", 35°41'00.00"). The circle c has the center of (141°4'20.77", 35°41'00.00") and the radius of 24 km.

When determining that abnormal nearing will not occur between the aircraft of interest and a peripheral aircraft (NO in step B7), the link adjustment width calculation means 33 inputs the speed of the aircraft of interest extracted in step B6 into the movement plan-to-be-adjusted determination means 34. The movement plan-to-be-adjusted determination means 34 scans each link after the link (link input from the link adjustment width calculation means 33) of the aircraft of interest used in step B6 in time sequence based on the changed speed, and corrects the passage times of the aircraft of interest (the start point times and end point times of the links of the aircraft of interest) (step B8). The link adjustment width calculation means 33 then causes the output device 5 to output the corrected links of the aircraft of interest. When the changed speed is the original speed of the aircraft of interest (340 (km/h) in the above example), the passage times of the aircraft of interest do not change before and after the correction.

When determining that abnormal nearing will occur between the aircraft of interest and any peripheral aircraft (YES in step B7), the link adjustment width calculation means 33 calculates an avoidance speed of the aircraft of interest and adds the avoidance speed to the changed speed candidate queue (step B9). A method for calculating an avoidance speed will be described below.

The link adjustment width calculation means 33 calculates the coordinates of points of contact between the tangent lines of the circle c passing through the start point of the link segment s and the circle c. The link adjustment width calculation means 33 uses the projection matrix M indicating mapping from the calculation plane into the 3D space thereby to map the coordinates of the points of contact into the 3D space. The coordinates of the points of contact are denoted as $(x_c, y_c)$. The link adjustment width calculation means 33 defines a vector of $(x_c, y_c, t_{A1}, 1)$. The vector is assumed as p. $t_{A1}$ is the start point time of the link of the aircraft of interest, but in the present exemplary embodiment, the start point times of the aircraft of interest and the peripheral aircraft are common. The first row in the projection matrix M is assumed as M1, the second row is assumed as M2 and the third row is assumed as M3.

The link adjustment width calculation means 33 calculates the inner product p·M1 of $p=(x_c, y_c, t_{A1}, 1)$ and M1, the inner product p·M2 of the vector p and M2, and the inner product p·M3 of the vector p and M3. At this time, the point having the coordinate value of (p·M1, p·M2, p·M3) in the 3D space is a point which is obtained by mapping the point of contact within the calculation plane into the 3D space.

The link adjustment width calculation means 33 calculates the t coordinate passing through the start point of the link of the aircraft of interest and its mapped point and corresponding to the x coordinate $x_{A2}$ and the y coordinate $y_{A2}$ at the end point of the link of the aircraft of interest. The t coordinate is the end point arrival time of the aircraft of interest calculated based on the tangent lines of the circle c. The link adjustment width calculation means 33 calculates a changed speed of the aircraft of interest based on a temporal difference between the end point arrival time and the start point time of the link of the aircraft of interest, and a distance between the start point and the end point of the link of the aircraft of interest in the 2D plane.

Two tangent lines of the circle c are obtained as illustrated in FIG. 10, and thus two changed speeds of the aircraft of interest are also obtained. The link adjustment width calculation means 33 calculates a changed speed of the aircraft of interest per tangent line of the circle c. In the example illustrated in FIG. 10, the speed is calculated at 427.2022 (km/h) when the arrival time is put ahead to 12:47:45.1536, and is calculated at 280.4025 (km/h) when the arrival time is delayed to 13:12:45.1536.

In step B9, the link adjustment width calculation means 33 excludes the speeds exceeding the upper limit speed and the speeds below the lower limit speed defined as movement condition among the calculated changed speeds, and adds the non-excluded and remaining changed speeds to the changed speed candidate queue. It is assumed that the upper limit speed of "640 km/h" and the lower limit speed of "240 km/h" are defined as in the aforementioned example. When 427.2022 (km/h) and 280.4025 (km/h) are calculated as described above, the changed speeds fall within the range between the lower limit speed and the upper limit speed. Thus, the changed speeds are added to the changed speed candidate queue without being excluded. Consequently, the changed speed candidate queue is {427.2022 (km/h), 280.4025 (km/h)}.

After step B9, the link adjustment width calculation means 33 determines whether the changed speed candidate queue is empty (step B10). In step B10, the empty changed speed candidate queue means that abnormal nearing will occur between the aircraft of interest and any peripheral aircraft but the changed speed capable of avoiding the abnormal nearing does not fall within the range between the lower limit speed and the upper limit speed. When the changed speed candidate queue is empty (YES in step B10), the link adjustment width calculation means 33 sends the fact that the changed speed cannot avoid abnormal nearing between the aircraft of interest and any peripheral aircraft to the output device 5, and the output device 5 outputs the message and terminates the processing.

When the changed speed candidate queue is not empty, the link adjustment width calculation means 33 deletes the link of the peripheral aircraft determined as abnormally nearing to the aircraft of interest in previous step B6 from the links input from the peripheral aircraft movement plan selection means 32 (step B12).

After step B12, the link adjustment width calculation means 33 repeats the processing in and subsequent to step B6. When the processing proceeds from step B12 to step B6, the link adjustment width calculation means 33 determines whether abnormal nearing will occur between the aircraft of interest and a peripheral aircraft for each peripheral aircraft not excluded and remaining in step B12.

When performing step B6 after step B12, the link adjustment width calculation means 33 preferentially extracts a changed speed closer to the changed speed extracted in previous step B6 out of the two changed speeds added in previous step B9. For example, as a result of previous step B9, when the changed speed candidate queue is {427.2022 (km/h), 280.4025 (km/h)} and the changed speed extracted in previous step B6 is 340 (km/h), the link adjustment width calculation means 33 extracts 280.4025 (km/h) closer to 340 (km/h).

Figure 12:
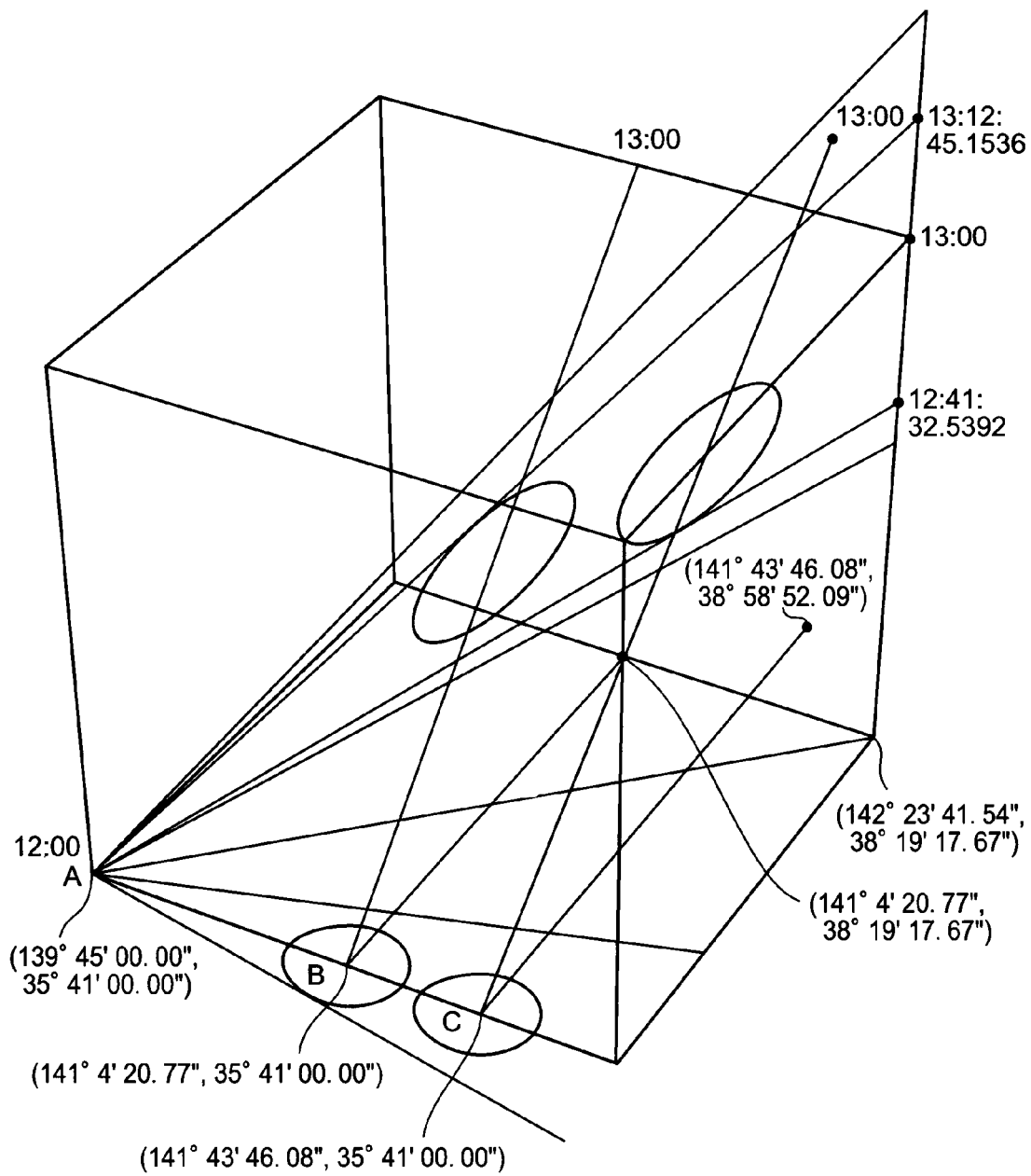
FIG. 12 It depicts a schematic diagram illustrating exemplary arrival times when the speed is accelerated and exemplary arrival times when the speed is decelerated.

For example, as illustrated in FIG. 12, it is assumed that the arrival time is at 12:41:32.5392 when the speed is accelerated and the arrival time is at 13:12:45.1536 when the speed is decelerated. Also in this case, two speeds corresponding to the two arrival times are obtained. When the two speeds are added to the changed speed candidate queue and then step B6 is performed again, the link adjustment width calculation means 33 preferentially extracts the changed speed closer to the changed speed extracted in previous step B6.

In the second and subsequent processing in step B9, when the faster changed speed calculated is slower than the speed calculated as the faster changed speed in previous step B9, the changed speed is not added to the changed speed candidate queue. Similarly, when the slower changed speed calculated is faster than the speed calculated as the slower changed speed in previous step B9, the changed speed is not added to the changed speed candidate queue.

When determining that abnormal nearing will not occur between the aircraft of interest and a peripheral aircraft in step B6 (NO in step B7), the link adjustment width calculation means 33 inputs the speed of the aircraft of interest extracted in step B6 into the movement plan-to-be-adjusted determination means 34. The movement plan-to-be-adjusted determination means 34 scans each link after the link of the aircraft of interest used in step B6 in time sequence based on the changed speed, and corrects the passage times of the aircraft of interest (step B8). The link adjustment width calculation means 33 causes the output device 5 to output the corrected links of the aircraft of interest.

According to the present exemplary embodiment, a link of a peripheral aircraft which can abnormally near to the aircraft of interest is specified by the same processing as in the first exemplary embodiment. Then, a link of the peripheral aircraft and a link of the aircraft of interest are used to determine whether abnormal nearing will occur between the aircraft of interest and the peripheral aircraft, and when abnormal nearing will occur, an avoidance speed of the aircraft of interest is calculated to correct the passage times of the aircraft of interest. Thus, the links of the peripheral aircrafts for which a determination is to be made as to whether abnormal nearing to the aircraft of interest will occur can be narrowed, and the number of determinations as to whether abnormal nearing will occur between the aircraft of interest and a peripheral aircraft or the number of calculations of the avoidance speed can be reduced. Consequently, the movement plan of the aircraft of interest can be quickly adjusted.

A variant of the second exemplary embodiment will be described below.

In the second exemplary embodiment, when an avoidance speed is determined for a link of the aircraft of interest which will abnormally near to a peripheral aircraft, the movement plan is adjusted such that the aircraft of interest moves through the entire link at the avoidance speed. There may be configured such that a position where the movement speed is changed is designated from the outside in the link of the aircraft of interest and the movement plan is adjusted to change the speed from the position. For example, after step A1, when the manager inputs a speed change start position for any link included in the set of links of the aircraft of interest created by the link creation means 31, the link creation means 31 divides the link of the aircraft of interest at the designated speed change start position, and divides one link into two links. Then, the processing in and subsequent to step A2 may be performed. In this way, one link is divided at a designated position thereby to apply the avoidance speed in the middle of the original undivided link.

In the repeated processing in steps B6 to B12, when the start point times of a link of the aircraft of interest and a link of a peripheral aircraft are different from each other, as illustrated in the variant of the first exemplary embodiment, the start point coordinate of the link at the earlier start point time may be replaced for convenience. That is, the link start point coordinate (x, y, t) at the earlier start point time may be replaced to be the same as the start point time of the link at the latest start point time. The processing in steps B6 to B12 may be then performed.

Third Exemplary Embodiment

When an avoidance speed is applied to one entire link of the aircraft of interest and the aircraft of interest makes uniform linear motion at the avoidance speed through the link, even if abnormal nearing to a peripheral aircraft B can be avoided, abnormal nearing to another peripheral aircraft C may not be avoided. In the variant of the second exemplary embodiment, there has been described the case in which the manager designates a speed change start position in a link of the aircraft of interest and divides the link of the aircraft of interest into two links at the speed change start position thereby to find an avoidance speed at the position (speed change start position) in the middle of the original link. In the third exemplary embodiment, the data processing device 3 specifies a speed change start position in a link of the aircraft of interest. Then, the link of the aircraft of interest is divided into two links at the speed change start position thereby to find an avoidance speed in the middle of the original link.

Figure 13:
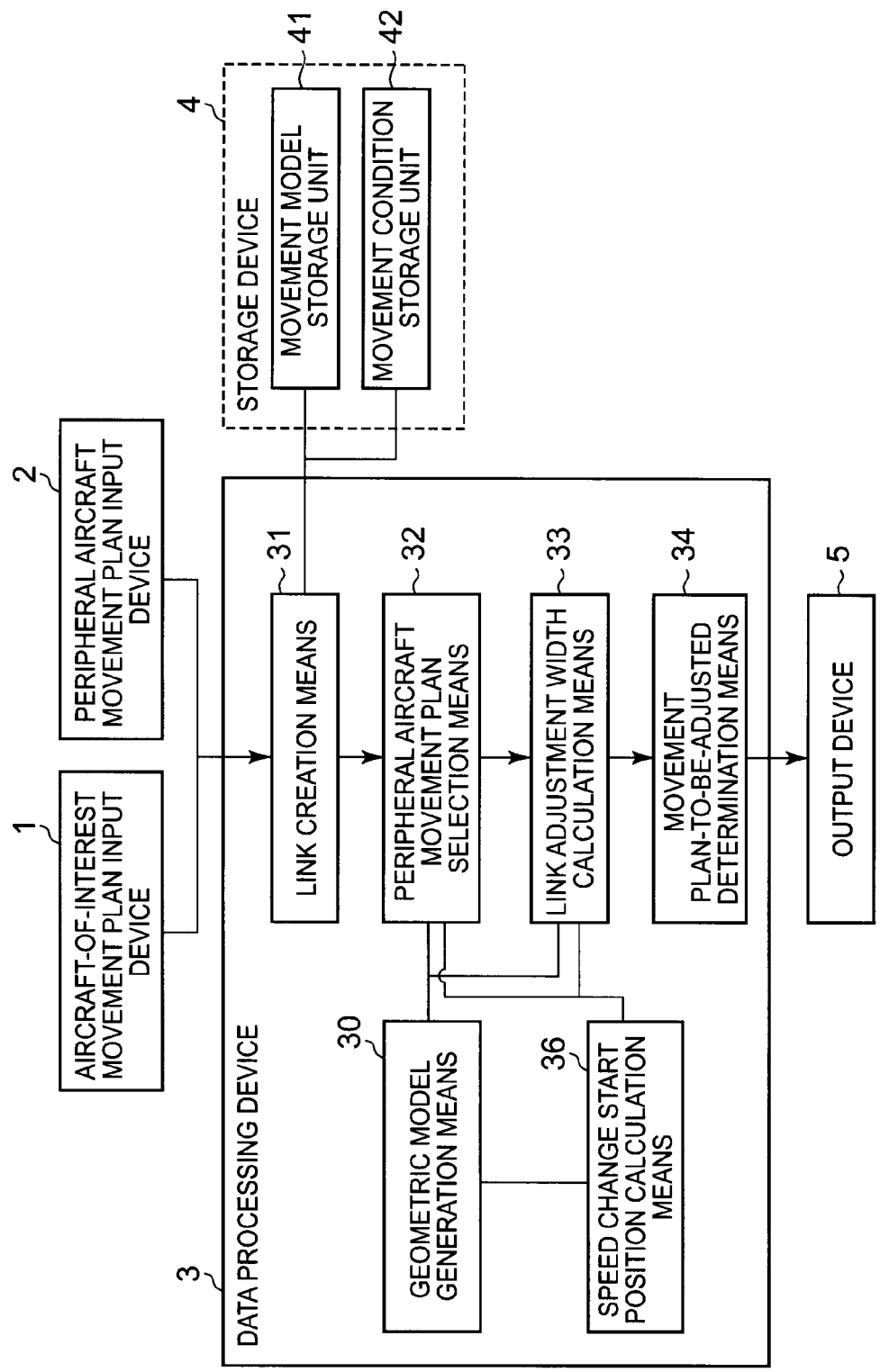
FIG. 13 It depicts a block diagram illustrating an exemplary structure of a movement-measurement-processing system according to a third exemplary embodiment of the present invention.

FIG. 13 is a block diagram illustrating an exemplary structure of the movement-measurement-processing system according to the third exemplary embodiment of the present invention. The same components as the components in the second exemplary embodiment are denoted with the same reference numerals as in FIG. 9, and a detailed description thereof will be omitted. In the third exemplary embodiment, the data processing device 3 includes the link creation means 31, the peripheral aircraft movement plan selection means 32, the geometric model generation means 30, the link adjustment width calculation means 33, the movement plan-to-be-adjusted determination means 34, and a speed change start position calculation means 36.

The geometric model generation means 30 calculates the projection matrices m and M for a given link pair similarly as in the second exemplary embodiment.

In the present exemplary embodiment, the peripheral aircraft movement plan selection means 32 extracts a link pair including one link of the aircraft of interest and one link of a peripheral aircraft which have a common part in the times from the start point time to the end point time. The peripheral aircraft movement plan selection means 32 then inputs each link pair into the geometric model generation means 30, and acquires the matrices m and M per link pair from the geometric model generation means 30. The peripheral aircraft movement plan selection means 32 then determines whether the aircraft of interest will abnormally near to the peripheral aircraft per combination of link pair and combination of matrices m and M. Further, the peripheral aircraft movement plan selection means 32 specifies a link pair of the aircraft of interest and the peripheral aircraft for which the abnormal nearing time is the earliest.

The speed change start position calculation means 36 uses the circle c in the link of the peripheral aircraft with the earliest abnormal nearing time with the aircraft of interest thereby to calculate a speed change start position in the link of the aircraft of interest, divides the link of the aircraft of interest at the speed change start position, and sends the divided links of the aircraft of interest to the peripheral aircraft movement plan selection means 32.

Also in the present exemplary embodiment, for simplified description, each processing will be described assuming that the start point time is common between a link of the aircraft of interest and a link of each peripheral aircraft. When the start point times of a link of the aircraft of interest and a link of a peripheral aircraft are different from each other, as described in the variants of the first exemplary embodiment and the second exemplary embodiment, the start point coordinate of the link at the earlier start point time may be replaced for convenience. That is, the link start point coordinate (x, y, t) at the earlier start point time may be replaced to be the same as the start point time of the link at the latest start point time.

The speed change start position calculation means 36 is realized by the CPU in a computer operating according to the movement-measurement-processing program, for example. The speed change start position calculation means 36 may be realized by different hardware from other components.

Figure 14:
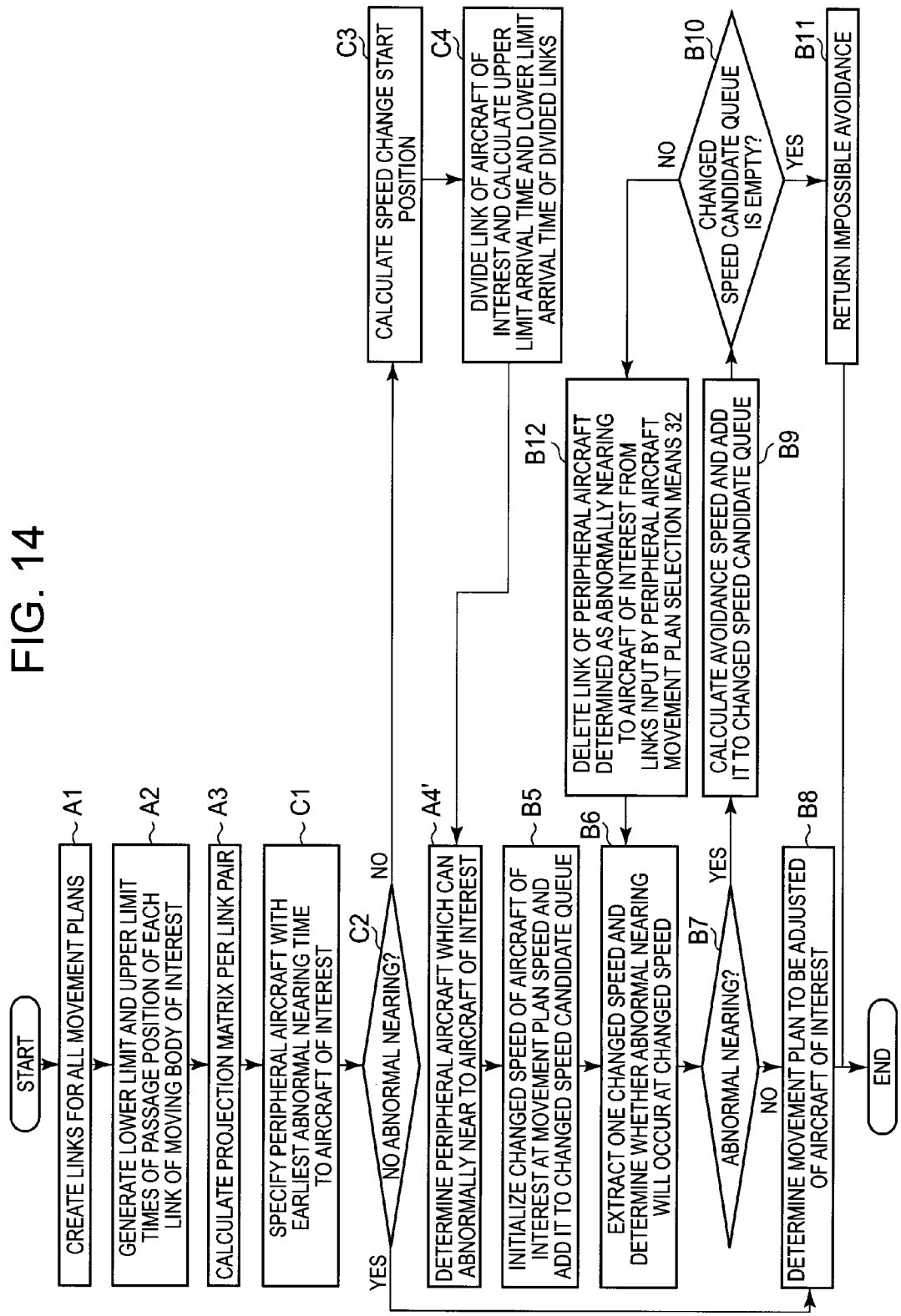
FIG. 14 It depicts a flowchart illustrating exemplary processing progress according to the third exemplary embodiment of the present invention.

Processing progress according to the third exemplary embodiment will be described below. FIG. 14 is a flowchart illustrating exemplary processing progress according to the third exemplary embodiment of the present invention. The processing in steps A1 to A3 are the same as in the second exemplary embodiment, and a description thereof will be omitted.

After step A3, the peripheral aircraft movement plan selection means 32 determines whether the aircraft of interest will abnormally near to a peripheral aircraft per link pair having a common part in the times from the start point time to the end point time and combination of projection matrices m and M. The peripheral aircraft movement plan selection means 32 then specifies a peripheral aircraft with the earliest abnormal nearing time among the peripheral aircrafts abnormally nearing to the aircraft of interest (step C1).

The processing of determining whether the aircraft of interest will abnormally near to the peripheral aircraft for one link pair is the same as the determination processing in step B6 in the second exemplary embodiment. That is, when a link of the aircraft of interest is assumed as FA=[$(x_{A1}, y_{A1}, t_{A1})$, $(x_{A2}, y_{A2}, t_{A2})$], the peripheral aircraft movement plan selection means 32 calculates a line segment s having the start point $(x_{A1}, y_{A1})$, and the end point with the x coordinate which is an inner product of $(x_{A2}, y_{A2}, 0, 1)$ and m1 (the first row in the projection matrix m) and the y coordinate which is an inner product of $(x_{A2}, y_{A2}, t_{A2}, 1)$ and m2 (the second row in the projection matrix m). When a link of a peripheral aircraft is assumed as FB=[$(x_{B1}, y_{B1}, t_{B1})$, $(x_{B2}, y_{B2}, t_{B2})$], a circle whose center is $(x_{B1}, y_{B1})$ and whose radius is the oceanic airspace in the calculation plane is assumed as circle c. The peripheral aircraft movement plan selection means 32 may determine that the aircraft of interest will abnormally near to the peripheral aircraft when the line segment s crosses with the circle c, and may determine that they will not abnormally near to each other when they do not cross with each other.

The peripheral aircraft movement plan selection means 32 then specifies a link pair having the shortest distance from the start point of the line segment s to a cross point between the line segment s and the circle c from among the link pairs for which abnormal nearing is determined as occurring. The peripheral aircraft movement plan selection means 32 inputs the link pairs and the projection matrices m and M calculated for the link pairs into the speed change start position calculation means 36.

When a peripheral aircraft which will abnormally near to the aircraft of interest is not present (YES in step C2), the peripheral aircraft movement plan selection means 32 sends the information that the movement plan of the aircraft of interest does not need to be corrected to the movement plan determination means 34, and the movement plan determination means 34 determines that the movement plan of the aircraft of interest is not to be corrected (step B8).

When a peripheral aircraft which will abnormally near to the aircraft of interest is present (NO in step C2), the speed change start position calculation means 36 calculates a speed change start position by use of the link pairs input from the peripheral aircraft movement plan selection means 32 in step C1 (or the link pairs of the aircraft of interest and the peripheral aircraft which will abnormally near to each other at the earliest time) and the projection matrices m and M for the link pairs (step C3).

The speed change start position calculation means 36 generates a link in which the end point time of the link of the aircraft of interest in the input link pair is replaced with the lower limit arrival time (or possibly the upper limit arrival time). With the description with reference to FIG. 3, the speed change start position calculation means 36 generates a link in which the end point of the link FA of the aircraft of interest is replaced with $E_1$ (or possibly $E_2$). There has been described herein the case in which a link in which the end point time of the link of the aircraft of interest is replaced with the lower limit arrival time or the upper limit arrival time is generated, but a link in which the end point time is replaced with the arrival time when the aircraft of interest moves at other predetermined speed may be generated. When the lower limit arrival time or the upper limit arrival time is used, the lower limit arrival time or the upper limit arrival time calculated in step A2 may be used. There will be assumed below a case in which a link in which the end point time of the link of the aircraft of interest is replaced with the lower limit arrival time (or link when the aircraft of interest moves at the upper limit speed) is generated.

The speed change start position calculation means 36 maps the link to a line segment on the calculation plane by use of the projection matrix m. Further, the speed change start position calculation means 36 maps the original link of the aircraft of interest to a line segment on the calculation plane. The processing of mapping a link onto the calculation plane has been described above, and thus a description thereof will be omitted.

Figure 15:
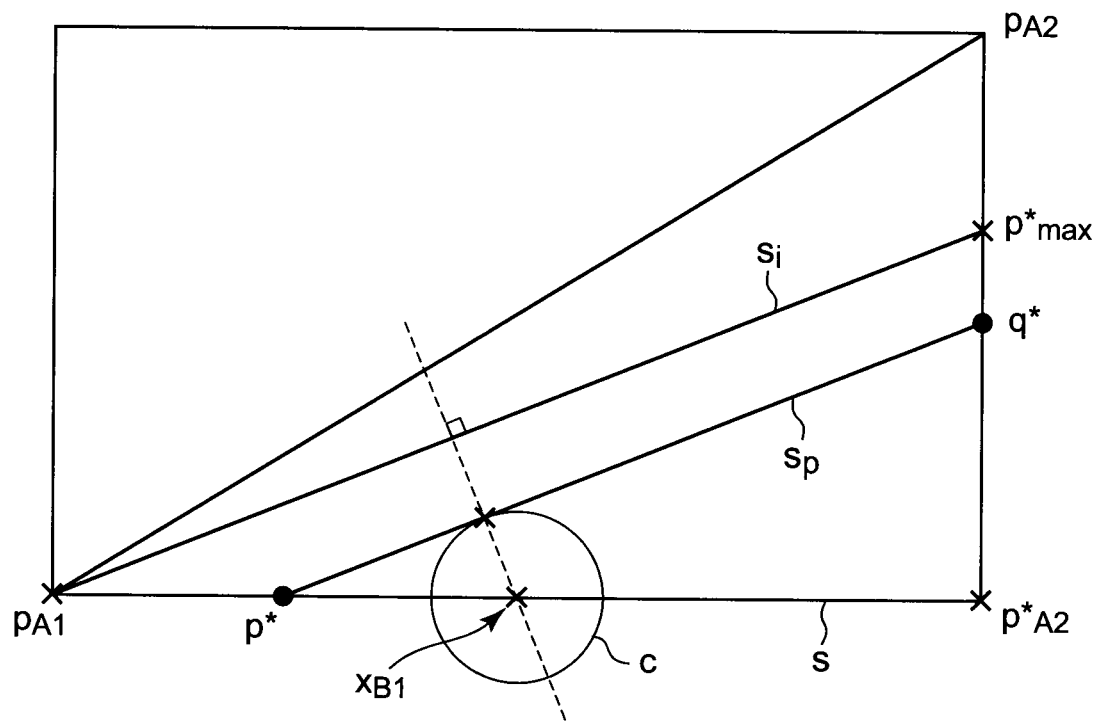
FIG. 15 It depicts a schematic diagram illustrating a calculation plane.

FIG. 15 is a schematic diagram illustrating the calculation plane. That is, in the example illustrated in FIG. 3 and others, a plane including the bottom of the illustrated cube corresponds to the calculation plane, and FIG. 15 illustrates the calculation plane. $p_{A1}$ indicated in FIG. 15 is the start point of the aircraft of interest in the 2D plane and $p_{A2}$ is the end point of the aircraft of interest in the 2D plane. A line segment having the extreme points $p_{A1}$ and $p^*_{max}$ is obtained by mapping the link when the aircraft of interest moves at the upper limit speed onto the calculation plane. The line segment will be denoted as $s_1$ below.

The line segment s having the extreme points $p_{A1}$ and $p^*_{A2}$ is obtained by mapping the original link of the aircraft of interest onto the calculation plane.

$x_{B1}$ is the start point of the peripheral aircraft B. The circle c has the center of the start point $x_{B1}$ and the radius of the oceanic airspace. The speed change start position calculation means 36 calculates a straight light $s_p$ parallel with the line segment $s_1$ and contacting with the circle c, and calculates the cross point $p^*$ between the straight line $s_p$ and the line segment s. Two straight lines parallel with the line segment $s_1$ and contacting with the circle c are present, and thus two cross points between the straight lines and the line segment s can be present, but the speed change start position calculation means 36 calculates the point $p^*$ closer to the start point $s_{A1}$ of the line segment s.

The speed change start position calculation means 36 then maps the point $p^*$ on the calculation plane into the 3D space by use of the projection matrix M. $p^*$ is on the line segment s, and thus a mapping result of $p^*$ into the 3D space is present on the link of the aircraft of interest. The processing of mapping a point on the calculation plane into the 3D space is the same as the processing of mapping a point of contact on the calculation plane into the 3D space by the link adjustment width calculation means 33 in step B9 described in the second exemplary embodiment, and thus a description thereof will be omitted herein.

A point on the link of the aircraft of interest which is obtained by mapping the point $p^*$ into the 3D space is the speed change start position.

The speed change start position calculation means 36 then divides the link of the aircraft of interest into two at the speed change start position. For example, assuming a link of the aircraft of interest as $FA=[(x_{A1}, y_{A1}, t_{A1}), (x_{A2}, y_{A2}, t_{A2})]$ and a speed change start position as $(x_{A3}, y_{A3}, t_{A3})$, the link may be divided into the link $[(x_{A1}, y_{A1}, t_{A1}), (x_{A3}, y_{A3}, t_{A3})]$ from the start point of the undivided link to the speed change start position and the link $[(x_{A3}, y_{A3}, t_{A3}), (x_{A2}, y_{A2}, t_{A2})]$ from the speed change start position to the end point of the undivided link. The speed change start position calculation means 36 then calculates the upper limit arrival time and the lower limit arrival time for the divided links (step C4).

The speed change start position calculation means 36 inputs the divided links of the aircraft of interest as well as the upper limit arrival time and the lower limit arrival time of the divided links into the peripheral aircraft movement plan selection means 32.

The peripheral aircraft movement plan selection means 32 determines a peripheral aircraft which can abnormally near to the aircraft of interest (step A4'). The processing is similar to step A4 in the first and second exemplary embodiments. For the links of the aircraft of interest generated by the dividing in step C4, a link of the peripheral aircraft which has a common part therewith in the time from the start point time to the end point time is searched again and the projection matrices m and M are calculated by the geometric model generation means 30 for the resultant link pair. Then, the similar processing to step A4 in the first and second exemplary embodiments is performed.

The processing in and subsequent to step B5 after step A4' are the same as in the second exemplary embodiment.

According to the present exemplary embodiment, when the aircraft of interest moves at a predetermined changed speed (such as the upper limit speed or the lower limit speed) from a middle point in a link, a speed change start position capable of avoiding a peripheral aircraft which will abnormally near at the earliest time is calculated for the link of the aircraft of interest. Consequently, abnormal nearing to a peripheral aircraft which is scheduled to abnormally near later than the peripheral aircraft can be also avoided, thereby reducing the number of peripheral aircrafts which can abnormally near.

Figure 16:
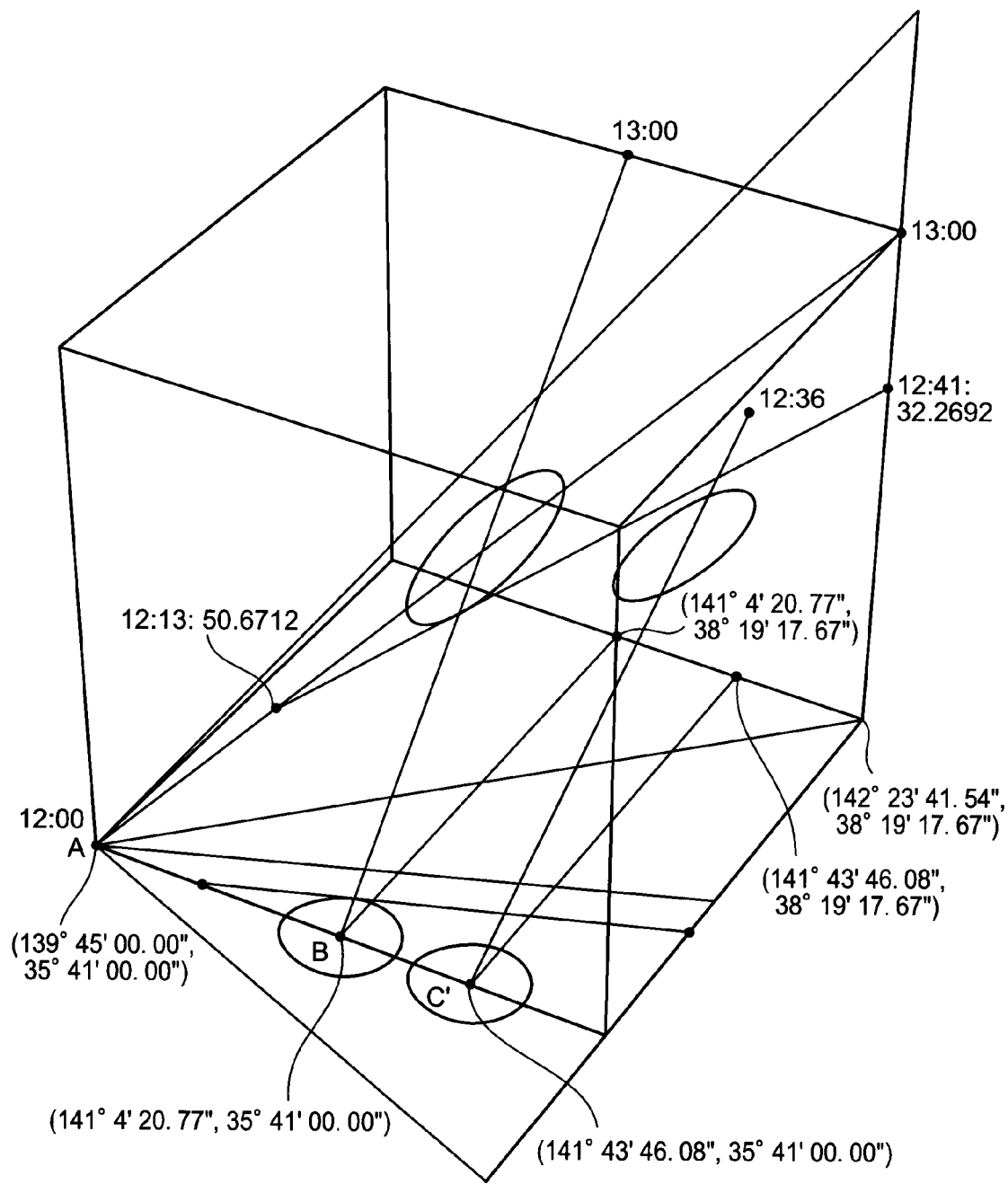
FIG. 16 It depicts a schematic diagram illustrating a specific example of an effect according to the third exemplary embodiment.

FIG. 16 is a schematic diagram illustrating a specific example of an effect of the third exemplary embodiment. The link of the aircraft of interest A and the link of the peripheral aircraft B illustrated in FIG. 16 are the same as the links illustrated in FIG. 4. It is assumed that the link of the peripheral aircraft C' illustrated in FIG. 16 is $FP_{C'}$= [(141°43'46.08", 35°41'00.00", 12:00), (141°43'46.08", 38°19'17.67", 12:36)]. In this case, the time (t coordinate) of the speed change start position calculated in the processing of the third exemplary embodiment is 13:13:50.6712, and when the aircraft of interest flies from the time at the upper limit speed, it arrives at the end point at 12:41:32.2692. In this case, the peripheral aircraft movement plan selection means 32 can exclude the peripheral aircraft C' from the peripheral aircrafts which can abnormally near to the aircraft of interest.

Figure 17:
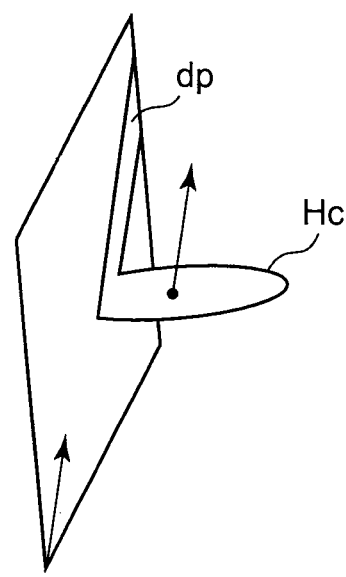
FIG. 17 It depicts a schematic diagram illustrating how a tilted column H defined by a link FB of a peripheral aircraft crosses with a plane when the courses of an aircraft of interest and the peripheral aircraft are on the same straight line or parallel with each other.

There has been described in each above exemplary embodiment the case in which the course of the aircraft of interest and the course of a peripheral aircraft are neither on the same straight line nor parallel with each other. The projection matrices will be described when the courses of the aircraft of interest and a peripheral aircraft are on the same straight line or parallel with each other. FIG. 17 is a schematic diagram illustrating crossing between the tilted column H defined by the link FB of a peripheral aircraft and the plane including the region $P_o$ (not illustrated in FIG. 17, see FIG. 3) when the courses of the aircraft of interest and the peripheral aircraft are on the same straight line or parallel with each other. FIG. 17 illustrates the circle $H_c$ which is a cross section of the tilted column H. As illustrated in FIG. 17, in this case, the crossing between the tilted column H and the plane is not an oval but a parallelogram $d_p$. A link of the aircraft of interest is assumed as $FA=[(x_{A1}, y_{A1}, t_{A1}), (x_{A2}, y_{A2}, t_{A2})]$.

In such a case, any straight line passing through the point $(x_{A2}, y_{A2}, t_{A2})$ and crossing with the calculation plane can be used instead of the straight line formed by the peripheral aircraft. Herein, a straight line expressed in the following Equation (3) is assumed to be used.

$$(y_{A2}-y_{A1})x+(-x_{A2}+x_{A1})y+x_{A2}y_{A1}-x_{A1}y_{A2}=0 \qquad \text{Equation (3)}$$

Figure 18:
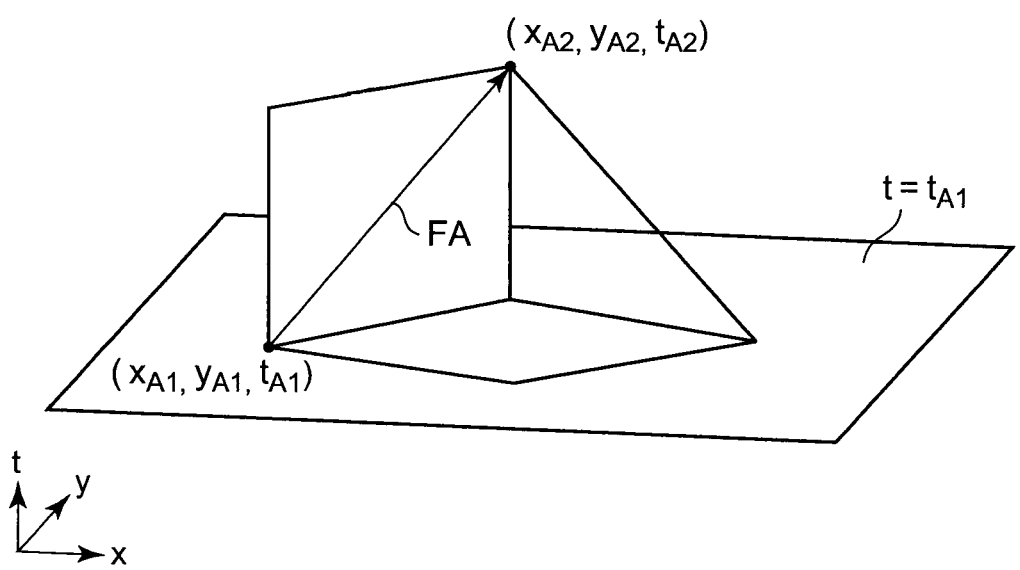
FIG. 18 It depicts a schematic diagram illustrating an alternative line to a straight line formed by a peripheral aircraft.

The straight line passes through the point $(x_{A2}, y_{A2}, t_{A2})$ and forms 45° with the plane at $t=t_{A1}$ as illustrated in FIG. 18.

In this case, the geometric model generation means 30 may calculate a matrix defined by the following Equation (4) as the projection matrix M indicating mapping from the calculation plane into the 3D space.

[Mathematical formula 3]

$$M = \begin{pmatrix} 1-c_1 y_A & 0+c_1 x_A & 0 & -c_1 D_2 \\ 0+c_2 y_A & 1-c_2 x_A & 0 & c_2 D_2 \\ 0+c_3 y_A & 0-c_3 x_A & 1 & c_3 D_2 \end{pmatrix} \qquad \text{Equation (4)}$$

$D_2$ is found by calculating the following Equation (5).

[Mathematical formula 4]

$$D_2 = \begin{vmatrix} x_A & y_A \\ x_{A1} & y_{A1} \end{vmatrix}$$

Equation (5)

$c_1$, $c_2$ and $c_3$ are found by calculating the following Equation (6) to Equation (8), respectively.

$$c_1 = y_A/D_1$$ Equation (6)

$$c_2 = x_A/D_1$$ Equation (7)

$$c_3 = t_A/D_1$$ Equation (8)

$D_1$, $x_A$, $y_A$ and $t_A$ are found by calculating the following Equation (9) to Equation (12), respectively.

$$D_1 = x_A^2 + y_A^2$$ Equation (9)

$$x_A = x_{A2} - x_{A1}$$ Equation (10)

$$y_A = y_{A2} - y_{A1}$$ Equation (11)

$$t_A = t_{A2} - t_{A1}$$ Equation (12)

Further, the geometric model generation means 21 may calculate a matrix defined in the following Equation (13) as the projection matrix m indicating mapping from the 3D space onto the calculation plane.

[Mathematical formula 5]

$$m = \begin{pmatrix} 1 & 0 & c_4 & -c_4 t_{A1} \\ 0 & 1 & c_5 & -c_5 t_{A1} \\ 0 & 0 & 0 & t_{A1} \end{pmatrix}$$

Equation (13)

$c_4$ and $c_5$ are found by calculating the following Equation (14) and Equation (15), respectively.

$$c_4 = y_A/t_A$$ Equation (14)

$$c_5 = x_A/t_A$$ Equation (15)

When the courses of the aircraft of interest and the peripheral aircraft are on the same straight line or parallel with each other, the geometric model generation means 30 calculates the projection matrices M and m found by Equation (4) and Equation (13), for example. The points other than the calculations of the projection matrices M and m are the same as in each exemplary embodiment described above.

Figure 19:
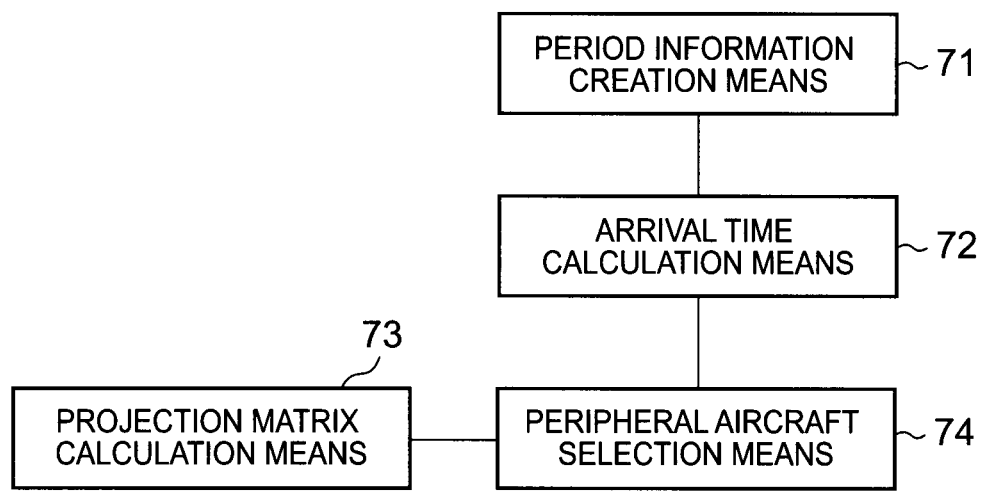
FIG. 19 It depicts a block diagram illustrating an exemplary minimum structure of the present invention.

A minimum structure of the present invention will be described below. FIG. 19 is a block diagram illustrating a minimum structure of the present invention. The movement-measurement-processing system according to the present invention includes a period information creation means 71, an arrival time calculation means 72, a projection matrix calculation means 73 and a peripheral aircraft selection means 74.

The period information creation means 71 (the link creation means 31, for example) creates a set of period information (such as links) each having a 3D coordinate with the coordinate values of the 2D coordinates of a passage position of a moving body and its passage time as information on a start point and an end point from a movement plan of the aircraft of interest for which the movement plan is to be adjusted and a movement plan of each peripheral aircraft other than the aircraft of interest.

The arrival time calculation means 72 (the link creation means 31 for performing step A2, for example) calculates a lower limit arrival time which is the end point arrival time when the aircraft of interest moves at an upper limit speed and an upper limit arrival time which is the end point arrival time when it moves at a lower limit speed for each item of period information of the aircraft of interest.

The projection matrix calculation means 73 (the geometric model generation means 30, for example) calculates a first projection matrix (such as projection matrix m) indicating mapping from a 3D space onto a 2D plane based on a period information pair (such as link pair) having one item of period information of the aircraft of interest and one item of period information of a peripheral aircraft.

The peripheral aircraft selection means 74 (the peripheral aircraft movement plan selection means 32, for example) selects a peripheral aircraft which can abnormally near to the aircraft of interest by determining how a region (such as region L) obtained by mapping a region (such as region $P_0$ illustrated in FIG. 3) in a 3D space defined by the start point of period information of the aircraft of interest, a point having the coordinate values of passage position coordinates at the end point of the period information and the lower limit arrival time, and a point having the coordinate values of passage position coordinates at the end point of the period information and the upper limit arrival time onto a 2D plane by use of the first projection matrix crosses with a circle whose center is a passage position of the peripheral aircraft and whose radius is a determination standard threshold as to whether abnormal nearing will occur.

With the structure, a peripheral aircraft which can abnormally near to the aircraft of interest can be quickly specified.

Further, the projection matrix calculation means may calculate a second projection matrix (such as projection matrix M) indicating mapping from a 2D plane into a 3D space based on a period information pair, and the movement-measurement-processing system may further comprises an avoidance speed derivation means (the link adjustment width calculation means 33, for example) which defines a line segment by mapping period information of the aircraft of interest paired with period information of a peripheral aircraft which can abnormally near to the aircraft of interest onto a 2D plane by use of a first projection matrix, when the line segment crosses with a circle whose center is a passage position of the peripheral aircraft which can abnormally near to the aircraft of interest and whose radius is a threshold, calculates coordinates of points of contact between tangent lines of the circle passing through the start point of the line segment and the circle, maps the coordinates of the points of contact to points in the 3D space by use of the second projection matrix, and calculates period information of the aircraft of interest corresponding to a changed speed and the changed speed based on the coordinates of the points in a repeated manner, thereby finding an avoidance speed for avoiding abnormal nearing between the aircraft of interest and each peripheral aircraft determined as being able to abnormally near thereto.

The period information creation means 71 may divide period information of the aircraft of interest into two items of period information across an externally designated point.

The peripheral aircraft selection means 74 may specifies a peripheral aircraft with the earliest abnormal nearing time to the aircraft of interest, and the movement-measurement-processing system may further comprises a period information division means which calculates a speed change point in a period indicated by period information of the aircraft of interest paired with period information of the peripheral aircraft which can abnormally near to the aircraft of interest based on a circle whose center is a passage position of the peripheral aircraft and whose radius is a threshold and predetermined speeds of the moving bodies, divides the period information of the aircraft of interest into two items of period information across the speed change point (such as speed change start position), and calculates an upper limit arrival time and a lower limit arrival time of the divided period information.

The present application claims the priority based on Japanese Patent Application No. 2012-133865 filed on Jun. 13, 2012, the disclosure of which is all incorporated herein by reference.

The present invention has been described above with reference to the exemplary embodiments, but the present invention is not limited to the above exemplary embodiments. The structure and details of the present invention may be variously changed within the scope of the present invention understandable by those skilled in the art.

INDUSTRIAL APPLICABILITY

The present invention is suitably applied to a system for specifying a peripheral aircraft which can abnormally near to an aircraft of interest based on movement plans of moving bodies.

REFERENCE SIGNS LIST

30 Geometric model generation means
31 Link creation means
32 Peripheral aircraft movement plan selection means
33 Link adjustment width calculation means
34 Movement plan-to-be-adjusted determination means
36 Speed change start position calculation means

What is claimed is:

1. A movement-measurement-processing system comprising:
a period information creation unit, including a processor, for creating a set of period information each having a 3D coordinate with coordinate values of 2D coordinates of a passage position of a moving body and passage time of the moving body as information on a start point and an end point from a movement plan of an aircraft of interest which is a moving body for which the movement plan is to be adjusted and a movement plan of each peripheral aircraft which is a moving body other than the aircraft of interest;
an arrival time calculation unit, including the processor, for calculating a lower limit arrival time which is an end point arrival time when the aircraft of interest moves at an upper limit speed and an upper limit arrival time which is an end point arrival time when the aircraft of interest moves at a lower limit speed for each item of period information of the aircraft of interest;
a projection matrix calculation unit, including the processor, for calculating a first projection matrix indicating mapping from a 3D space onto a 2D plane based on a period information pair having one item of period information of the aircraft of interest and one item of period information of a peripheral aircraft; and
a peripheral aircraft selection unit, including the processor, for selecting a peripheral aircraft which is abnormally near to the aircraft of interest by determining how a region obtained by mapping the region in the 3D space defined by a start point of period information of the aircraft of interest, a point having the coordinate values of passage position coordinates at an end point of the period information and the lower limit arrival time, and a point having the coordinate values of the passage position coordinates at the end point of the period information and the upper limit arrival time into the 2D plane by use of the first projection matrix crosses with a circle whose center is a passage position of the peripheral aircraft and whose radius is a determination standard threshold as to whether abnormal nearing will occur,
wherein a speed of the movement plan of the aircraft of interest is adjusted, by the processor, based on a movement plan of interest of the selected peripheral aircraft and the adjusted movement plan of the aircraft of interest in order to avoid a collision between the aircraft of interest and the selected peripheral aircraft.

2. A movement-measurement-processing method comprising steps of:
creating, by a processor, a set of period information each having a 3D coordinate with coordinate values of 2D coordinates of a passage position of a moving body and passage time of the moving body as information on a start point and an end point from a movement plan of an aircraft of interest which is a moving body for which the movement plan is to be adjusted and a movement plan of each peripheral aircraft which is a moving body other than the aircraft of interest;
calculating, by the processor, a lower limit arrival time which is an end point arrival time when the aircraft of interest moves at an upper limit speed and an upper limit arrival time which is an end point arrival time when the aircraft of interest moves at a lower limit speed for each item of period information of the aircraft of interest; calculating, by the processor, a first projection matrix indicating mapping from a 3D space onto a 2D plane based on a period information pair having one item of period information of the aircraft of interest and one item of period information of a peripheral aircraft; and
selecting, by the processor, a peripheral aircraft which is abnormally near to the aircraft of interest by determining how a region obtained by mapping the region in the 3D space defined by a start point of period information of the aircraft of interest, a point having the coordinate values of passage position coordinates at an end point of the period information and the lower limit arrival time, and a point having the coordinate values of the passage position coordinates at the end point of the period information and the upper limit arrival time into the 2D plane by use of the first projection matrix crosses with a circle whose center is a passage position of the peripheral aircraft and whose radius is a determination standard threshold as to whether abnormal nearing will occur,
wherein a speed of the movement plan of the aircraft of interest is adjusted, by the processor, based on a movement plan of interest of the selected peripheral aircraft and the adjusted movement plan of the aircraft of interest in order to avoid a collision between the aircraft of interest and the selected peripheral aircraft.

3. A non-transitory computer readable recording medium containing instructions, that when executed by a processor, cause the processor to perform a method, the method comprising:
- period information creation processing of creating a set of period information each having a 3D coordinate with coordinate values of 2D coordinates of a passage position of a moving body and passage time of the moving body as information on a start point and an end point from a movement plan of an aircraft of interest which is a moving body for which the movement plan is to be adjusted and a movement plan of each peripheral aircraft which is a moving body other than the aircraft of interest;
- arrival time calculation processing of calculating a lower limit arrival time which is an end point arrival time when the aircraft of interest moves at an upper limit speed and an upper limit arrival time which is an end point arrival time when the aircraft of interest moves at a lower limit speed for each item of period information of the aircraft of interest;
- projection matrix calculation processing of calculating a first projection matrix indicating mapping from a 3D space onto a 2D plane based on a period information pair having one item of period information of the aircraft of interest and one item of period information of a peripheral aircraft; and
- peripheral aircraft selection processing of selecting a peripheral aircraft which is abnormally near to the aircraft of interest by determining how a region obtained by mapping the region in the 3D space defined by a start point of period information of the aircraft of interest, a point having the coordinate values of passage position coordinates at an end point of the period information and the lower limit arrival time, and a point having the coordinate values of the passage position coordinates at the end point of the period information and the upper limit arrival time into the 2D plane by use of the first projection matrix crosses with a circle whose center is a passage position of the peripheral aircraft and whose radius is a determination standard threshold as to whether abnormal nearing will occur,
- wherein a speed of the movement plan of the aircraft of interest is adjusted, by the processor, based on a movement plan of interest of the selected peripheral aircraft and the adjusted movement plan of the aircraft of interest in order to avoid a collision between the aircraft of interest and the selected peripheral aircraft.

* * * * *